(12) United States Patent
Wiechers

(10) Patent No.: US 12,073,455 B2
(45) Date of Patent: Aug. 27, 2024

(54) SIMPLIFIED DELIVERY OF SHIPMENTS WITH GOODS NOT YET PAID FOR

(71) Applicant: Ralph Wiechers, Mayschoß (DE)

(72) Inventor: Ralph Wiechers, Mayschoß (DE)

(73) Assignee: Deutsche Post AG, Bonn (DE)

( * ) Notice: Subject to any disclaimer, the term of this patent is extended or adjusted under 35 U.S.C. 154(b) by 872 days.

(21) Appl. No.: 15/332,052

(22) Filed: Oct. 24, 2016

(65) Prior Publication Data

US 2017/0132692 A1 May 11, 2017

(30) Foreign Application Priority Data

Nov. 5, 2015 (DE) ...................... 10 2015 119 004.4

(51) Int. Cl.
  *G06Q 30/0601* (2023.01)
  *G06Q 10/08* (2023.01)
  (Continued)

(52) U.S. Cl.
  CPC ......... *G06Q 30/0635* (2013.01); *G06Q 10/08* (2013.01); *G06Q 10/083* (2013.01); *G06Q 50/60* (2024.01); *G06Q 20/3223* (2013.01)

(58) Field of Classification Search
  CPC ............... G06Q 30/0635; G06Q 50/32; G06Q 20/3223; G06Q 10/08; G06Q 10/083
  (Continued)

(56) References Cited

U.S. PATENT DOCUMENTS 9,547,962 B2* 1/2017 Motoyama ......... G06Q 10/0836
2001/0054025 A1 12/2001 Adams et al.
(Continued)

FOREIGN PATENT DOCUMENTS

CN 101443722 A 5/2009
CN 101785012 A 7/2010
(Continued)

OTHER PUBLICATIONS

Wikipedia, "Package Tracking," Internet Article, Oct. 7, 2014, 3 pages.
(Continued)

*Primary Examiner* — Michelle T Kringen
(74) *Attorney, Agent, or Firm* — Reinhart Boerner Van Deuren P.C.

(57) ABSTRACT

A method with the steps of obtaining first information by a deliverer, wherein the first information includes: delivery consent information from which it follows that a person consents to the delivery of a shipment identifiable using the delivery consent information despite the absence of the person, wherein the shipment contains a good which must be paid for; paid information from which it follows that a payment for a good contained in a shipment identifiable at least using the paid information has been performed; or payment information with which a payment for a good contained in a shipment is permitted to be performed at a person's expense without further involvement of the person; and delivering the shipment or displaying second information, wherein obtaining the first information is a necessary condition for performing the delivering of the shipment or the displaying the second information.

24 Claims, 3 Drawing Sheets

(51) Int. Cl.
*G06Q 10/083* (2023.01)
*G06Q 50/60* (2024.01)
*G06Q 20/32* (2012.01)

(58) Field of Classification Search
USPC ...................................................... 705/26.81
See application file for complete search history.

(56) References Cited

U.S. PATENT DOCUMENTS

| | | | | |
|---|---|---|---|---|
| 2002/0087461 | A1* | 7/2002 | Ganesan | G06Q 20/10 |
| | | | | 705/39 |
| 2002/0111914 | A1 | 8/2002 | Terada et al. | |
| 2003/0231112 | A1* | 12/2003 | Raju | A47G 29/141 |
| | | | | 340/569 |
| 2011/0087887 | A1 | 4/2011 | Luft et al. | |
| 2012/0246077 | A1 | 9/2012 | Skaaksrud et al. | |

FOREIGN PATENT DOCUMENTS

| | | | | |
|---|---|---|---|---|
| DE | 20 2011 101 134 U1 | 9/2011 | | |
| DE | 10 2013 015 521 A1 | 3/2014 | | |
| WO | WO-2014116320 A1 * | 7/2014 | ........... | G06Q 10/083 |
| WO | WO-2015065763 A1 * | 5/2015 | ........... | G06Q 10/083 |

OTHER PUBLICATIONS

Wikipedia, "Paketzentrum," Internet Article, Sep. 14, 2015, 17 pages.
Wikipedia, "Mobile Device," Internet Article, Oct. 20, 2015, 5 pages.
Wikipedia, "Sendungsverfolgung," Internet Article, Jun. 15, 2015, 8 pages.
Wikipedia, "Packstation," Internet Article, Oct. 24, 2015, 20 pages.
Oliver Drobnik, "Barcodes with iOS, Bringing Together the Digital and Physical Worlds," Book, Feb. 19, 2015, 113 pages, Manning Publications Co., Shelter Island, NY.
Wikipedia, "Mobile Payment," Internet Article, Nov. 1, 2015, 9 pages.
Rainer Gievers, "Das Praxisbuch Online-Shopping für Einsteiger," Book, Oct. 14, 2015, 14 pages, Borgentreich, Germany.
Wikipedia, "Electronic Banking," Internet Article, Sep. 27, 2015, 14 pages.
Harold F. Tipton et al., "Information Security Management Handbook," Book, Dec. 30, 2003, 19 pages, Fifth Edition, CRC Press LLC, Boca Raton, Florida.
Wikipedia, "Mobile Ticketing," Internet Article, Oct. 29, 2015, 4 pages.
Wikipedia, "Location-Based Service," Internet Article, Oct. 3, 2015, 11 pages.
Wikipedia: "Track and trace", Internet Article, Jul. 3, 2015, 2 pages.
Wikipedia: "Object hyperlinking", Internet Article, Sep. 22, 2014, 4 pages.
Oliver Drobnrk: "Barcodes with iOS—Bringing together the digital and physical worlds", Feb. 19, 2015, 248 pages.
Vedat Coskun et al: "Near Field Communication (NFC): From Theory to Practice", Feb. 13, 2012, 262 pages.
Wikipedia: "Mobile ticketing", Internet Article, Oct. 29, 2015, 5 pages.
Wikipedia: "Package tracking", Internet Article, Oct. 7, 2014, 4 pages.
Rainer Gievers: "Das Praxisbuch Online-Shopping fur Einsteiger", Oct. 14, 2015, Gievers, 124 pages.
Peter Stavroulakis et al: "Handbook of information and communication security", Apr. 4, 2010, Springer, DE, 120 pages.
ParcelForce: "Customs charges on non-eu goods—A simple guide", Internet Article, Nov. 19, 2013, 8 pages.
Die Schweizerische Post: "Auf Ihre Wunsche abgestimmt—Angebote und Preise fur Geschaftskunden", Internet Article, Mar. 19, 2012, 78 pages.
Hendrik Harter: "E-Paper—Cleveres Display ersetzt das T0rschild", Elektronikpraxis Internet Article, 21. Jan. 21, 2014, 2 pages.
Hossein Bidgoli, "The Handbook of Technology Management: Supply Chain Management, Marketing and Advertising, and Global Management (vol. 2)", Jan. 12, 2010, 4 pages.
Norbert Bartneck et al., Siemens, "Optimizing Processes with RFID and Auto ID", Apr. 20, 2009, 141 pages, Publicis.

* cited by examiner

SIMPLIFIED DELIVERY OF SHIPMENTS WITH GOODS NOT YET PAID FOR

CROSS-REFERENCE TO RELATED PATENT APPLICATION

This patent application claims priority to German Application No. 10 2015 119 004.4, filed Nov. 5, 2015, the entire teachings and disclosure of which are incorporated herein by reference thereto.

FIELD

Exemplary embodiments of the invention relate to simplifying the delivery of shipments with goods not yet paid for, in particular cash on delivery shipments.

BACKGROUND

Alongside payment methods such as credit card payment, payment on account, by transfer or by direct debit, cash on delivery is enjoying increasing popularity in mail-order trade. In the case of payment by cash on delivery, an ordered good is usually paid for only at the time of the delivery of the shipment containing the good to the recipient (who may be the buyer of the good, for example). The payment is usually made to the deliverer by the recipient at the time of the delivery of the shipment, and the deliverer hands over the shipment with the good to the recipient only when the payment has been completely effected, and the deliverer then later passes on the payment obtained to the sender of the good.

Payment by cash on delivery is advantageous for the buyer of a good insofar as payment must only be made when the shipment is actually obtained, that is to say that the risk of no good being obtained despite payment having been made may be ruled out. From the vendor's viewpoint compared with payment variants such as payment on account or by direct debit, there is the advantage that there is no risk of a delivered good not being paid for or a direct debit in this regard being canceled by the buyer.

SUMMARY OF SOME EXEMPLARY EMBODIMENTS OF THE INVENTION

In the case of payment by cash on delivery, payment collection by the deliverer on the basis of cash payment, in particular, at the time of delivery is time-consuming and laborious both for the deliverer and for the recipient of the shipment. In particular, for this purpose the recipient must tender exactly what may possibly be large amounts of money, in general even in counted-out form. Furthermore, the shipment may usually be delivered only if the addressee is at home or the deliverer meets another person, for example the addressee's neighbor, who however must not only be prepared to receive the shipment but also be informed by the addressee as to whether the latter would like to obtain the shipment at all, and must then accordingly make the payment to the deliverer instead of the addressee.

The delivery of cash on delivery shipments in parcel boxes, which are installed in a manner similar to mailboxes at the residence or place of business of the addressee in order to receive shipments even in the absence of the addressee, but have a larger capacity, is not possible at all at the present time.

In the case of payment by cash on delivery for shipments which are delivered to a lockbox installation, in particular a package station, for later collection by the addressee, the disadvantage arises that the unit (e.g. a package station) in which the storage compartment is accommodated must be available to receive payments either by way of personnel or corresponding technical equipment in order that the addressee can pay for the good upon collection from the storage compartment.

Even in the case of cash on delivery shipments which are intended to be delivered to a storage site such as, for example, a retail outlet, a filling station, a restaurant, etc. and may subsequently be collected there by the addressee, problems arise since, in order to relieve the burden on the deliverer, a payment for the good would basically already have to be performed upon delivery of the shipment to the storage site, which may not be accomplished, however, by the storage site owing to considerations vis a vis complexity and/or risk (it would then be necessary firstly to handle the payment with the deliverer and subsequently, upon collection of the shipment, once again to handle the payment with the addressee). For this reason, the delivery of cash on delivery shipments to such storage sites is not possible at the present time.

Therefore, inter alia it is an object of the present invention to simplify the delivery of shipments with goods not yet paid for, in particular cash on delivery shipments. In this case, the intention inter alia is to identify how the payment for the good at the time of delivery may be accelerated or rendered unnecessary by technical measures, such that it is also no longer necessary for the addressee to be present at the time of delivery.

A first exemplary aspect of the invention discloses a method comprising the following:
- obtaining or capturing first information by a deliverer or a device of the deliverer, wherein the first information comprises at least the following:
- delivery consent information from which it follows or is derivable that a person consents to the delivery of a shipment identifiable at least using the delivery consent information despite the absence of the person, wherein the shipment contains a good which must be paid for in the case of delivery;
- paid information from which it follows or is derivable that a payment for a good contained in a shipment identifiable at least using the paid information has been performed; or
- payment information with which a payment for a good contained in a shipment may and is permitted to be performed at a person's expense without further involvement of the person; and
- delivering the shipment or displaying or outputting second information from which it follows that the shipment is permitted to be delivered, wherein obtaining or capturing the first information is a necessary condition for performing the delivering of the shipment or the displaying or outputting of the second information.

A second exemplary aspect of the invention discloses a method comprising the following:
- obtaining or generating first information, wherein the first information comprises at least the following:
- delivery consent information from which it follows or is derivable that a person consents to the delivery of a shipment identifiable at least using the delivery consent information despite the absence of the person, wherein the shipment contains a good which must be paid for in the case of delivery;

paid information from which it follows or is derivable that a payment for a good contained in a shipment identifiable at least using the paid information has been performed; or payment information with which a payment for a good contained in a shipment may and is permitted to be performed at a person's expense without further involvement of the person; and providing or communicating the first information, wherein a capturing or obtaining of the provided or communicated first information by a deliverer or a device of the deliverer is a necessary condition for the shipment to be delivered by the deliverer.

The methods in accordance with the first and second aspects of the invention may in each case be performed by a human being, for example. In the case of the method in accordance with the first aspect of the invention, this may involve a deliverer of the shipment, for example. In the case of the method in accordance with the second aspect of the invention, this may involve for example an addressee of the shipment and/or a person who consents to the delivery, has performed the payment for the good or at the expense of whom the payment for the good is performed. Alternatively, the method in accordance with the first aspect of the invention and/or the method in accordance with the second aspect of the invention may also in each case be performed by one or more apparatuses. The method in accordance with the second aspect of the invention may be performed for example by a provision or communication entity, which may be human or non-human (e.g. an apparatus).

For the methods in accordance with the first and second aspects of the invention, furthermore, a respective apparatus is disclosed (and referred to hereinafter as apparatus in accordance with the first or second aspect of the invention) which is configured to perform and/or control the respective method or comprises respective means for performing and/or controlling the steps of the respective method. In this case, either all steps of the respective method may be controlled, or all steps of the respective method may be performed, or one or more steps may be controlled and one or more steps may be performed. One or more of the means may also be performed and/or controlled by the same unit. By way of example, one or more of the means may be constituted by one or more processors.

For the methods in accordance with the first and second aspects of the invention, furthermore, a respective apparatus is disclosed (and referred to hereinafter as apparatus in accordance with the first or second aspect of the invention) which comprises at least one processor and at least one memory including program code, the memory and the program code configured to, with the at least one processor, cause an apparatus (for example the apparatus comprising the processor and the memory) to perform and/or control at least the respective method. In this case, either all steps of the respective method may be controlled, or all steps of the respective method may be performed, or one or more steps may be controlled and one or more steps may be performed.

The apparatus in accordance with the first aspect of the invention may for example not be configured to deliver the shipment, but to display or output the second information.

The apparatus in accordance with the first aspect of the invention may be for example an electronic device, in particular a portable electronic device. The device may be for example the device of a deliverer who has to deliver the shipment. The device may be configured for example to capture information of shipments, in particular by optical and/or radio-based capture. In the case of optical capture, the information may for example be printed on the shipment or on a label of the shipment and be captured from the shipment or the label. In the case of radio-based capture, the information may for example be stored in a memory associated with the shipment (for example contained therein) and be captured from said memory. The device may be a handheld scanner of a deliverer, for example, on which the recipient of shipments may acknowledge receipt of shipments.

The apparatus in accordance with the second aspect of the invention may be for example an apparatus situated at the shipment delivery location. In the present case, the delivery location (or the location of the delivery) is understood to mean, in particular, the position at which the delivery of the shipment is performed. Said position is specified, in particular, in the delivery address of the shipment. It may be specified for example on the basis of a postal address (name, street, house number and place of residence). The apparatus may be installed there for example in a positionally fixed manner, for example as part of a mailbox installation and/or parcel box installation having one or more compartments for receiving shipments even in the absence of the addressee (from the delivery location at the delivery time), of a building automation system or building control system, of an access control system for buildings or vehicles, of a door communication system or of an electronic display sign, or as an apparatus operatively connected to one of said installations or systems. Alternatively, the apparatus in accordance with the second aspect of the invention may have been positioned (for instance in a container, for example a mailbox or parcel box), or installed at least in order to enable the delivery of the shipment at the delivery location.

The apparatus in accordance with the second aspect of the invention may alternatively be an electronic device of a person (in particular of the addressee of the shipment) who consents to the delivery, has performed the payment for the good or at whose expense the payment is performed, for example in the form of a cellular phone (for example Smartphone) or a computer, in particular a tablet, laptop or desktop computer. The apparatus may be situated at the delivery location at the delivery time. Alternatively, the apparatus may not be situated at the delivery location at the delivery time.

Alternatively, the apparatus in accordance with the second aspect of the invention may also be a server which generates the first information and then communicates (in particular transmits) it to a further apparatus (for example to a device of the person (in particular of the addressee of the shipment) or to an apparatus installed or at least temporarily positioned at the delivery location), for example in order that the further apparatus may enable the capturing or obtaining of the first information by the deliverer or a device of the deliverer or the capturing or obtaining of the first information by the deliverer or a device of the deliverer may be made possible with the further apparatus. The server may be integrated for example in the back-end of a delivery company which is responsible for the delivery of the shipment.

For the methods in accordance with the first and second aspects of the invention, furthermore, a respective system is disclosed (and referred to hereinafter as system in accordance with the first or second aspect of the invention) which comprises one or more apparatuses configured to perform and/or control the respective method or having means for performing and/or controlling the steps of the respective method. In this case, either all steps of the respective method may be controlled, or all steps of the respective method may be performed, or one or more steps may be controlled and one or more steps may be performed.

Furthermore, a system is disclosed which comprises at least one apparatus in accordance with the first aspect of the invention and an apparatus in accordance with the second aspect of the invention. In this system, in particular, the information provided or communicated by the apparatus in accordance with the second aspect of the invention is obtained or captured by the apparatus in accordance with the first aspect of the invention.

For the methods in accordance with the first and second aspects of the invention, furthermore, a respective computer program is disclosed (and referred to hereinafter as computer program in accordance with the first or second aspect of the invention) which comprises program instructions that cause a processor to perform and/or control the respective method when the computer program runs on the processor. In this specification, a processor should be understood to mean, inter alia, control units, microprocessors, microcontrol units such as microcontrollers, digital signal processors (DSP), application-specific integrated circuits (ASICs) or Field Programmable Gate Arrays (FPGAs). Here either all steps of the respective method may be controlled, or all steps of the respective method may be performed, or one or more steps may be controlled and one or more steps may be performed. The computer program may be distributable for example via a network such as the internet, a telephone or mobile radio network and/or a local network. The computer program may be at least partly software and/or firmware of a processor. It may equally be implemented at least partly as hardware. The computer program may be stored for example on a computer-readable storage medium, e.g. a magnetic, electrical, electromagnetic, optical and/or other type of storage medium. The storage medium may be for example part of the processor, for example a (nonvolatile or volatile) program memory of the processor or a part thereof. The storage medium is for example substantive, that is to say tangible and/or non-transitory.

Exemplary embodiments of all aspects of the present invention have individual, a plurality or all of the properties described below.

In exemplary embodiments of the invention, obtaining or capturing first information is a necessary condition for the shipment to be delivered by the deliverer or for second information, from which it follows that the shipment is permitted to be delivered, to be displayed or output (in particular by a device of the deliverer, as a result of which the deliverer is then informed and authorized to deliver the shipment). In this case, the first information may have various embodiments.

If the first information comprises for example delivery consent information or paid information, for example no payment process may be required at the time of the delivery and the delivery process may thus be made more efficient and faster. The presence of the addressee of the shipment at the delivery location at the time of the delivery may then also be dispensable, for example.

If the first information comprises delivery consent information, this signals to the deliverer or the device thereof that even in the absence of the person (from the delivery location at the delivery time) who has to pay for the good contained in the shipment, a delivery of the shipment may be performed. The person is for example the addressee of the shipment, that is to say is for example mentioned in a delivery address of the shipment and/or associated with the shipment in some other way. In this specification, the addressee of the shipment is understood to be, in particular, that person for whom a shipment is intended, that is to say in particular even if the shipment is delivered to a different recipient entity by a deliverer and the shipment must subsequently also be transferred from the recipient entity to the addressee.

It is then for example also possible to perform the delivery to a neighbor of the person, or into a mailbox and/or parcel box of the person (or into/onto some other location in the area at the disposal of the person, for example a vehicle, a garage, a summerhouse, a patio of the person), or into a storage compartment (e.g. a package station) from which the shipment may then later be collected by the person, in particular, or to a storage site (e.g. a parcel shop, a retail outlet, a filling station, a restaurant, etc.) from which the shipment may then later be collected by the person, in particular. A human or substantive entity into/to which the shipment is delivered is also referred to hereinafter as recipient entity.

The good is then paid for by the person for example after the delivery of the shipment, for example firstly to a delivery company (or a company associated therewith) which is responsible for the delivery of the shipment and acts as a trustee or billing collection service provider for the vendor of the good (said vendor for example also being the sender of the shipment). By way of example, the amount for the good contained in the shipment is debited from the person's account after delivery without further involvement or action of the person, for example from the person's account with the delivery company responsible for the delivery of the shipment, or from some other account for which the person has stored information (for example credit card information, direct debit information or login information) with the delivery company. The delivery consent information then not only expresses the person's consent that the delivery may be performed even in the absence of the person (from the delivery location at the delivery time) but also includes the person's consent to make the payment for the shipment at the expense of the person.

The hitherto customary requirement that the payment for the good in the case of a cash on delivery shipment must be performed at the time of the delivery (and at the location of the delivery) of the shipment is therefore abandoned here. From the point of view of the vendor of the good, the risk of payment cancelation is not increased for example if the delivery company undertakes the risk for payment cancelations. In order for its part to reduce the risk of a payment cancelation, the delivery company may make it possible for example only for those persons who are classified as trustworthy (for example on the basis of their previous behavior, for example their previous payment behavior) to signal by means of the first information that a delivery of the shipment may be performed even in the absence of the person (from the delivery location at the delivery time). This may be performed for example by the fact that in the case of an enquiry by the person for the first information at a server it is ascertained whether the enquiring person is classified as trustworthy and the first information is output to the enquiring person (or to a device of the enquiring person) only in the case of a positive ascertainment. In addition to the first information, further information may also be captured or obtained from which it follows or is derivable in what form the delivery is consented to in the absence of the person (from the delivery location at the delivery time), that is to say for example into/to which locations/compartments and/or to which persons. As a result, the consenting person may reduce his/her risk of the shipment being delivered to untrustworthy persons or to insecure locations/compartments in the absence of the person (from the delivery location at the delivery time).

If the first information comprises paid information, this signals to the deliverer or the device thereof that a payment for the good contained in the shipment has already been performed. The deliverer is thereby informed and authorized to perform the shipment without performing a payment process. The delivery of the shipment may be performed, if paid information was captured or obtained, in the presence of the addressee of the shipment (who may be for example the person who performed the payment for the good, or a different person) or in the absence of the addressee (from the delivery location at the delivery time). In addition to the first information, further information may also be captured or obtained from which it follows or is derivable whether the person who paid for the good consents to the delivery of the shipment even in the absence (from the delivery location at the delivery time) of the addressee (who may be for example the person who performed the payment for the good, or a different person) and/or into/to which locations/compartments and/or to which persons the delivery is permitted to be performed in the absence of the addressee (from the delivery location at the delivery time). As a result, the person may reduce his/her risk of the shipment being delivered to untrustworthy persons or to insecure locations/compartments in the absence of the person (from the delivery location at the delivery time).

If the first information comprises payment information, the payment for the good may be performed with said payment information without further involvement of the person. It thereby becomes possible, in particular, to perform the delivery of the shipment even in the absence of the person (from the delivery location at the delivery time) since, after obtaining or capturing the first information, no further involvement of the person is required. The first information may thus be provided in a capturable manner for the deliverer or the device thereof, for example at the shipment delivery location. The payment information may be used for example by the deliverer or the device thereof to make the payment, in particular using an online banking method. By way of example, the device of the deliverer in this case communicates with a server of a bank or of a credit card company in order to perform the payment. A confirmation of the payment made that is obtained by the device of the deliverer is then used by the deliverer for example as authorization for delivery of the shipment. In particular, the delivery of the shipment thus fails to occur, for example, if no confirmation of the payment for the shipment is obtained by the device of the deliverer, for example because the payment information was incorrect and/or because the payment could not be performed owing to lack of covering funds or lack of a payment framework of the person's account, and the person is absent during the delivery, such that the person cannot make the payment to the deliverer in cash. A successful outcome of the checking of the correctness of the payment information and/or of sufficient covering funds or a sufficient payment framework of an account indicated in the payment information or a successfully concluded payment process for the good using the payment information may be for example a further necessary prerequisite for delivering the shipment or displaying or outputting the second information. The payment information may comprise for example credit card information of the person or direct debit information (e.g. bank sort code and account number or a combination thereof, and possibly the magnitude of the amount to be debited). Alternatively, the payment information may also comprise different pieces of information which enable a payment for the good without further involvement of the person, for example prepaid codes or the like. By way of example, the payment information may express the fact that the person consents to a charge being debited to an account held with a delivery company responsible for the delivery of the shipment By way of example, the first information is generated with such payment information by an application installed on a device of the person. The first information may then be provided with check information, for example, which enables the deliverer or the device of the deliverer to check the authenticity and/or integrity of at least part of the first information (for example at least of the payment information), in particular without having to set up contact with a server for this purpose. The cryptographic information required for checking the check information (e.g. a key for checking check information embodied as a signature or for checking check information embodied as a message authentication code) may be stored for this purpose on the device of the deliverer, for example.

The first information is accessible to the deliverer or the device thereof for example only if said deliverer or device has performed successful authentication vis a vis an apparatus which provides or communicates the first information. This serves to protect the person's payment information against unauthorized access by third parties. By way of example, the first information may appear on a display unit of the apparatus if the deliverer has performed authentication vis a vis the first apparatus. This authentication may be required anyway for example in the context of the delivery. The displayed information may then be used by the deliverer or the device thereof (for example following optical capture) to make the payment After payment confirmation obtained by the deliverer or the device thereof, the delivery of the shipment may then be performed. The apparatus is for example part of a mailbox installation and/or parcel box installation having one or more compartments for receiving shipments even in the absence of the addressee, of a building automation system or building control system, of an access control system for buildings or vehicles, or of a door communication system, or is operatively connected to one of these installations or systems.

In exemplary embodiments of the invention, therefore, at the delivery time and at the delivery location it is possible to completely dispense with performing a payment process (for example if the first information comprises the delivery consent information or the paid information) or to handle the latter at least efficiently and in a cashless manner (for example if the first information comprises the payment information). In particular, it is possible nevertheless to perform the delivery of the shipment even in the absence of the person (from the delivery location at the delivery time), in particular independently of the form in which the delivery is made to a recipient entity, for example into a mailbox installation and/or parcel box installation (in particular at the place of residence or place of business of the person), into a storage compartment (e.g. a package station), to a storage site (e.g. a retail outlet) or to a neighbor of the person. For this purpose, the person may ensure that the first information, in particular at the delivery time at the delivery location, is capturable or obtainable by the deliverer or the device thereof. Advantageously, this capturabilty or obtainability is ensured by the fact that the first information is available to an apparatus which is present at the location of the delivery at least at the time of the delivery, and, by said apparatus, may be provided to the deliverer or the device thereof or be communicated thereto. Advantageously, the information may then be obtained or captured by the deliverer or the device thereof at the time of the delivery at the location of the delivery, without the device of the deliverer having to communicate with a server for this purpose; that is to say that, in particular, no radio connection to the server is required. The addressee of the shipment nevertheless has time, until shortly before delivery of the shipment, to provide for the provision/communication of the first information at the delivery location. Alternatively, the first information may also be provided/communicated to the deliverer or the device thereof before the delivery, in particular at the person's instigation.

In exemplary embodiments of the invention, the obtained or captured first information may serve as acknowledgement of the fact that the deliverer was actually at the delivery location. In this case, the first information is capturable or obtainable for example only at the delivery location, for example because it is provided or—in particular with restricted range (e.g. radio range in the case of wireless communication)—communicated by an apparatus installed at the delivery location or positioned there at least for the time of the delivery.

In exemplary embodiments of all aspects of the invention, the first information is provided by or at a first apparatus and is captured by the device of the deliverer. The first apparatus may be for example an apparatus in accordance with the second aspect of the invention. The first apparatus may be configured for example to display the first information. The first information is then captured optically, in particular. The optical capture may also comprise character recognition and/or decoding of coded information (for example of barcodes representing the first information). The first information may be displayed for example only after successful authentication of the deliverer or the device thereof vis a vis the first apparatus or some other apparatus operatively connected to the first apparatus. The display of the first information may be limited for example to a predefined period of time, in particular in order to save energy and/or to make it more difficult to spy out this information.

In exemplary embodiments of all aspects of the invention, the first information is communicated by a first apparatus and obtained by the device of the deliverer. The first apparatus may be for example an apparatus in accordance with the second aspect of the invention. Communicating may be based for example on wireless radio transmission, in particular on close-range radio communication. The close-range radio communication may allow for example a maximum possible distance between the two communication parties (device of the deliverer and first apparatus) of less than 100 m, 50 m, 10 m, 5 m, 2 m or 1 m. The radio communication (in particular the close-range radio communication) may be based for example on Bluetooth communication, near field communication (NFC) or Wireless Local Area Network (WLAN) communication, to mention just a few examples. In the case of the close-range radio communication, the necessity that at least one of the two communication parties must know the communication address of the other communication party before the communication is set up may advantageously be obviated, in particular. By way of example, it is possible to perform a communication for obtaining the first information between the device of the deliverer and the first apparatus, without a communication address of the first apparatus having to be known in the device of the deliverer or a communication address of the device of the deliverer having to be known in the first apparatus. This is considerably advantageous in particular vis a vis a communication based on mobile telephony between the first apparatus and the device of the deliverer, which presupposes a knowledge of the cellular phone number of the communication party to be called.

In both of the embodiments described above, the first apparatus may be situated at that location at which the delivery of the shipment is performed. Obtaining or capturing the first information may then take place for example at the delivery location of the shipment or in predefined proximity to the delivery location of the shipment (which is predefined for example by the radio range of a transmitter at the delivery location), that is to say for example at the delivery address of the shipment, for example on the basis of close-range radio communication or optical capture of information. Obtaining or capturing the first information is then advantageously also still possible at the time of the delivery, without the device of the deliverer having to be connected to a server (from which the first information could alternatively be obtained) or having to be configured at all for mobile communication with the server. This is advantageous particularly if the person decides only shortly before the delivery of the shipment (for instance in reaction to a notification in this regard from the delivery company to the person) to declare consent to the delivery of the shipment even in the absence of the person, to perform the payment or to provide the payment information. The first apparatus may for example be fixedly installed at the delivery location or be positioned at the delivery location at least at the time of the delivery.

In exemplary embodiments of all aspects of the invention, the first apparatus is part of a second apparatus or is operatively connected to the second apparatus, and the second apparatus is a mailbox installation and/or parcel box installation having one or more compartments for receiving shipments even in the absence of the addressee, a building automation system or building control system, an access control system for buildings or vehicles, a door communication system or an electronic display sign. The second apparatus is installed for example fixedly and permanently at the delivery location of the shipment. The core functionality of the second apparatus is, in particular, not the conveying of information to a deliverer or at least not of information concerning the delivery of shipments with goods not paid for or the payment for such goods. In accordance with the present exemplary embodiment, the functionality of the second apparatus is extended, however, to the effect that the first apparatus, which provides or communicates the first information, is provided as part of the second apparatus or is operatively connected to the second apparatus (such that for example exchange of useful and/or control data between first and second apparatuses is possible).

In exemplary embodiments of all aspects of the invention, the first information is generated by a third apparatus, in particular a server or a device of a person for whom the shipment is intended, and is transmitted indirectly or directly (e.g. via a wired or at least partly wireless connection) to the first apparatus or to a second apparatus operatively connected to the first apparatus. The server may be for example a server of the delivery company which is responsible for the delivery of the shipment Generating may involve using for example cryptographic information, for example a secret key (e.g. known only to the server) (e.g. an Advanced Encryption Standard (AES) key) and/or a secret method (e.g. known only to the server), which makes it possible for a deliverer or a device of the deliverer, upon or after obtaining or capturing the first information, to be able to check the authenticity and/or integrity of at least part of the first information (for example on the basis of a public key corresponding to the secret key (e.g. as an asymmetrical key pair, in particular as a key pair according to the Rivest-Shamir-Adlemann (RSA) method), or on the basis of a copy of the secret key). Generating the first information by the server may be initiated for example by the person, for example by interaction with a web page constituting an interface to the server, or by interaction with an application which is installed on the person's device and which communicates with the server. If the first information is generated on the person's device, this may be performed for example by an application which is installed on the device and with which the person interacts. In the application, the cryptographic information already described above may be stored (in particular in a protected memory area) or may be obtained from a server (in particular of the delivery company) for the generation of the first information and be erased again by the device after the generation. The transmission of the first information from the person's device to the first apparatus or second apparatus may be performed for example on the basis of the close-range radio communication already described, optical transmission (for example by capturing optical information, e.g. a code, displayed on a display unit of the person's device by the first apparatus), or a wired connection (for example a universal serial bus (USB) connection).

In exemplary embodiments of all aspects of the invention, the first information is generated by a server, is transmitted to a device of a person for whom the shipment is intended, and is transmitted by the device to the first apparatus or to a second apparatus operatively connected to the first apparatus. The exemplary properties of the generation of the first information at the server and the transmission of the first information from the person's device to the first or second apparatus, as outlined for the previous embodiment, may be correspondingly present here. By way of example, the person communicates with the server via a web page called up by means of the person's device, or an application installed on the person's device. In the context of this communication, the generation of the first information may be requested by the person's device (e.g. at the person's request, e.g. by indicating an identifier of the shipment or by selecting the shipment from a list of one or more shipments to be delivered to the person that is displayed on the web page or in the application). Depending on the type of first information requested, the request may also contain (further) information required for generating the first information, for example payment information. The server may make available the first information (for example the delivery consent information or the payment information, particularly if the person has stored details of the payment information on the server), to the person's device even without prior request by the device (for example for downloading by the device, or by transmission to the application on the device). This process may be initiated for example by an event in the delivery chain that the shipment passes through in the course of delivery, for example by the captured passage of the shipment through delivery stations such as sorting centers or loading stations, for example, or at a predefined time before the (predicted) delivery. This constitutes a particularly user-friendly variant for the person since the first information, when transmission to the first or second apparatus is desired, does not have to be requested from the server and, consequently, the first information may be transmitted to the first or second apparatus independently of a currently existing connection to the server. The first information (in particular the paid information) may also be generated by the server after the conclusion of a process of payment for the good contained in the shipment, which for example is likewise based on communication between the person's device and the server. The application on the device may be configured, for example, to initiate and/or control the transmission of the first information obtained to the first or second apparatus, for example at the person's instigation, but alternatively also automatically in reaction to obtaining the first information.

In exemplary embodiments of all aspects of the invention, the first information is input into a device of the deliverer or communicated or shown to the deliverer by a person. The above-described generation of the first information at the server or on the person's device may take place analogously in this embodiment. In that case, however, the first information is not provided or communicated to the deliverer or the device of the deliverer by means of the first apparatus, but rather is noted by the person and then communicated (for example orally or by demonstration) or shown (for example by presenting or handing over an optical reproduction of the first information on an information carrier, for example on paper or a label) to the deliverer. The person may for example have received the first information (in particular from the server) by means of said person's device, and then read off said information from a display unit of the device or print it out using the device. The first information may be represented for example in a form (e.g. as code) which is suitable for user-friendly communication/demonstration, for example as a numeric or alphanumeric code having a predefined maximum length, for example fewer than N characters, where N is a natural number from the interval of 1-20.

In exemplary embodiments of all aspects of the invention, the first information is communicated to the deliverer by a person in the context of a communication based on telephony, videotelephony or electronic messages with text and/or images. By way of example, the deliverer performs the communication with the device thereof, which may be for example a portable electronic device, in particular a cellular phone (e.g. a smartphone) or a handheld scanner. The communication takes place for example at least partly at the time of the delivery of the shipment. By way of example, the first information, obtaining which is a necessary condition for the delivery of the shipment, is communicated to the deliverer in this way. The electronic messages may be for example emails, SMS, MMS or fax messages, to mention just a few examples. This type of communication of the first information to the deliverer makes it possible for a shipment to be able to be delivered even in the absence of the person. The communication may be initiated for example by the deliverer, for example if the latter has reached the delivery location but does not meet the person for whom the shipment is intended.

In exemplary embodiments of all aspects of the invention, the communication is conducted by the person with a mobile communication device, in particular a cellular phone. This enables the deliverer or the device thereof to reach the person even in the event of absence from the delivery location at the delivery time, in order to obtain the first information, independently of the current whereabouts of the person.

A communication address (e.g. a telephone number or email address) for setting up the communication with the person is provided (e.g. electronically stored readably in a wireless or wired manner) for the deliverer or the device thereof for example at the delivery location or communicated thereto. The provision or communication may be linked, however, to a previous successful authentication of the deliverer, in particular vis a vis an apparatus which provides or communicates the communication address. The communication address may be provided for example in coded form, for example in the form of a one-dimensional or two-dimensional barcode. By way of example, the deliverer, by capturing the barcode using the device of said deliverer, may obtain the communication address and initiate the communication with the person.

The communication address for setting up the communication with the person may be stored for example in an apparatus which is situated at the delivery location of the shipment and sets up the communication between the deliverer and the person, in particular without the communication address becoming known to the deliverer or the device thereof. The apparatus may be for example the first apparatus already described above. The confidentiality of the communication address of the person may be preserved in this way. By way of example, the first apparatus then has means for configuring the communication, for example to function as a terminal in the communication.

In exemplary embodiments of all aspects of the invention, the first information is generated using an identifier of the shipment, in particular a shipment tracking number for the shipment. The shipment tracking number is communicated to the person for example by the delivery company in order to enable the person to obtain information about the current status of the delivery of the shipment on the basis of the shipment tracking number. The identifier of the shipment enables for example an identification of the shipment and/or differentiation from other shipments. The use of the identifier in generating the first information allows the first information to be linked to a specific identifier and thus a specific shipment Consequently, the first information relates only to exactly the shipment whose identifier was used in generating the first information. If the first information comprises delivery consent information or paid information, the first information thus reflects for what shipment the consent to delivery is intended to be declared or from what shipment a good was paid for.

In exemplary embodiments of all aspects of the invention, the first information comprises check information which makes it possible to check the authenticity and/or integrity of at least part of the first information. The check information may be for example a signature (for example in the form of an encrypted HASH value) or a message authentication code (MAC), e.g. a Keyed-Hash Message Authentication Code (HMAC). By way of example, for this purpose, a HASH value is formed by means of part of the first information (e.g. the useful information thereof) and is encrypted using a private key of an asymmetrical key pair in order to obtain the check information. If the first information is then obtained at an apparatus (e.g. the device of the deliverer), in order to check the integrity (intactness) of the obtained part of the first information and the check information (that is to say of the encrypted HASH value) by means of a corresponding part of the obtained first information (e.g. the useful information thereof) a HASH value may be formed and this HASH value may be compared with a decrypted version of the obtained HASH value. The decryption is based for example on a public key of the asymmetrical key pair. If the HASH values match, integrity of the part of the first information (e.g. the useful information thereof) and the check information may be assumed, and, if the private key is accessible only to a trustworthy entity, the authenticity of the part of the first information (e.g. the useful information thereof) and the check information may also be assumed (that is to say that the part of the first information and the check information originate from the trustworthy entity).

The inclusion of check information for making it possible to check the authenticity and/or integrity of at least part of the first information is advantageous insofar as the delivery consent information, the paid information and the payment information, which may be contained in particular in this part of the first information, are security-relevant pieces of information whose manipulation may lead to financial disadvantages for the person or the delivery company responsible for the delivery of the shipment. If the checking proceeds with a positive outcome, the deliverer may assume that the first information was generated by a trustworthy entity (in particular the server) and has not been altered since being generated.

The method in accordance with the first aspect of the invention may for example furthermore comprise checking the authenticity and/or integrity of at least part of the first information at least on the basis of the check information, wherein a positive result of checking is a further necessary condition for performing the delivering of the shipment or the displaying or outputting of the second information.

In the case of the method in accordance with the second aspect of the invention, for example, checking the authenticity and/or integrity of at least part of the first information on the basis of the check information with a positive result is a further necessary condition for the shipment to be delivered by the deliverer.

In exemplary embodiments of all aspects of the invention, the first information comprises at least the delivery consent information or the paid information in the form of a first code, and wherein a second code is associated with the shipment or is determinable or retrievable for the shipment. The codes may be for example alphabetic, numeric or alphanumeric codes, or barcodes, to mention just a few examples. The format of the codes may be chosen for example so as to ensure easy comparability of the codes even by a human being. This may be afforded for example in the case of numeric, alphabetic or alphanumeric codes particularly if the length thereof is not more than 10, 8, 6 or 4 characters, to mention just a few examples.

The first information may then comprise for example at least the delivery consent information in the form of the first code, and it follows or is derivable from the first code that a person consents to the delivery of the shipment despite the absence of the person if the first code corresponds to the second code in accordance with a predefined specification, in particular matches said second code. By way of example, it already follows here from the correspondence (e.g. matching) of the two codes that the first code is authentic and has integrity because otherwise it would not correspond to the second code, particularly if the two corresponding (for example matching) codes are chosen differently for each shipment from a multiplicity of shipments. By way of example, the first code is generated for each shipment using a random number or using an identifier of the shipment (which is different for each shipment, for example). The second code is then generated in each case in a manner corresponding to the first code, for example as a copy of the first code. A correspondence of the two codes may be defined for example by a predetermined specification, for example as identity.

The first information may alternatively comprise at least the paid information in the form of the first code, and it follows or is derivable from the first code that a payment for the good contained in the shipment has been performed if the first code corresponds to the second code in accordance with a predefined specification, in particular matches said second code. By way of example, it already follows here from the correspondence (e.g. matching) of the two codes that the first code is authentic and has integrity because otherwise it would not correspond to the second code, particularly if the two corresponding (for example matching) codes are chosen differently for each shipment from a multiplicity of shipments. By way of example, the first code is generated for each shipment using a random number or using an identifier of the shipment (which is different for each shipment, for example). The second code is then generated in each case in a manner corresponding to the first code, for example as a copy of the first code. A correspondence of the two codes may be defined for example by a predetermined specification, for example as identity.

The second code may for example be printed onto the shipment or a label on the shipment, may be stored readably in a storage element connected to the shipment or contained therein, may be stored in a device of the deliverer and may be identifiable there on the basis of pieces of information of the shipment, in particular an identifier of the shipment, or may be stored in a server or may be generatable by the latter and may be retrievable by means of a device of the deliverer from the server on the basis of pieces of information of the shipment, in particular an identifier of the shipment. In this way, the second code may be accessible or be made accessible to the deliverer or the device thereof in particular at the time of delivery, such that a comparison with the first code obtained or captured by the deliverer or the device thereof may be performed.

In exemplary embodiments of the first aspect of the invention, the method in accordance with the first aspect furthermore comprises: obtaining or capturing third information by a deliverer or a device of the deliverer, wherein it follows or is derivable from the third information in what form the delivery of the shipment is permitted to be performed in the absence of the person. Correspondingly, the method in accordance with the second aspect of the invention comprises in exemplary embodiments of the second aspect of the invention: obtaining or generating third information, wherein it follows or is derivable from the third information in what form the delivery of the shipment is permitted to be performed in the absence of the person, and providing or communicating the third information. The third information may specify for example into/to which locations/compartments and/or to which persons the delivery of the shipment is permitted to be performed in the absence of the person (from the delivery location at the time of the delivery). As a result, the consenting/paying person may reduce the latter's risk of the shipment being delivered to untrustworthy persons or to insecure locations/compartments in the absence of the person.

In exemplary embodiments of all aspects of the invention, a necessary condition for enabling the person to use the first information with the delivery consent information to signal said person's consent to the delivery of the shipment despite the absence of the person is that the person, in particular on the basis of a profile created for the person, is classified as a person who will actually pay for the good contained in the shipment after the delivery has been performed. By way of example, the first information is made available to the person, in particular in an application (which is integrated on a web page or installed on a device of the person, for example), only if the person is classified as a person who will actually pay for the good contained in the shipment after the delivery has been performed. If the person is not classified as a person who will actually pay for the good contained in the shipment after the delivery has been performed, the person, in particular in the application, may be given the opportunity, for example, to pay for the good, which may lead for example to the outputting of first information comprising paid information to the person or the device thereof, and/or the person, in particular in the application, is given the opportunity to obtain first information comprising payment information or to cause said first information to be transmitted to the person's device.

In exemplary embodiments of all aspects of the invention, the payment information comprises information for making a credit card payment, information for making a payment by direct debit or information for charging a debit to an account held with a delivery company responsible for the delivery of the shipment.

In exemplary embodiments of all aspects of the invention, the payment for the good is made to a second entity (e.g. a company or a person), which differs from a first entity (e.g. a company or a person), which is the vendor of the good and/or the sender of the shipment, and is active in particular as a billing collection service provider for the first entity. Alternatively, the payment for the good is made to the first entity.

The second entity is part of a company which performs at least part of the delivery process of the shipment or is economically associated with such a company.

The above-described embodiments and exemplary configurations of all aspects of the present invention, which initially stand by themselves in principle, should also be understood to be disclosed in all combinations with one another.

Further advantageous exemplary configurations of the invention can be gathered from the following detailed description of some exemplary embodiments of the present invention, in particular in conjunction with the figures. However, the figures accompanying the application are intended to serve only for the purpose of clarification, but not for determining the scope of protection of the invention. The accompanying drawings are not necessarily true to scale and are merely intended to reflect by way of example the general concept of the present invention. In particular, features contained in the figures ought not under any circumstances be deemed to be a necessary part of the present invention.

DETAILED DESCRIPTION OF SOME EXEMPLARY EMBODIMENTS OF THE INVENTION

Figure 1:
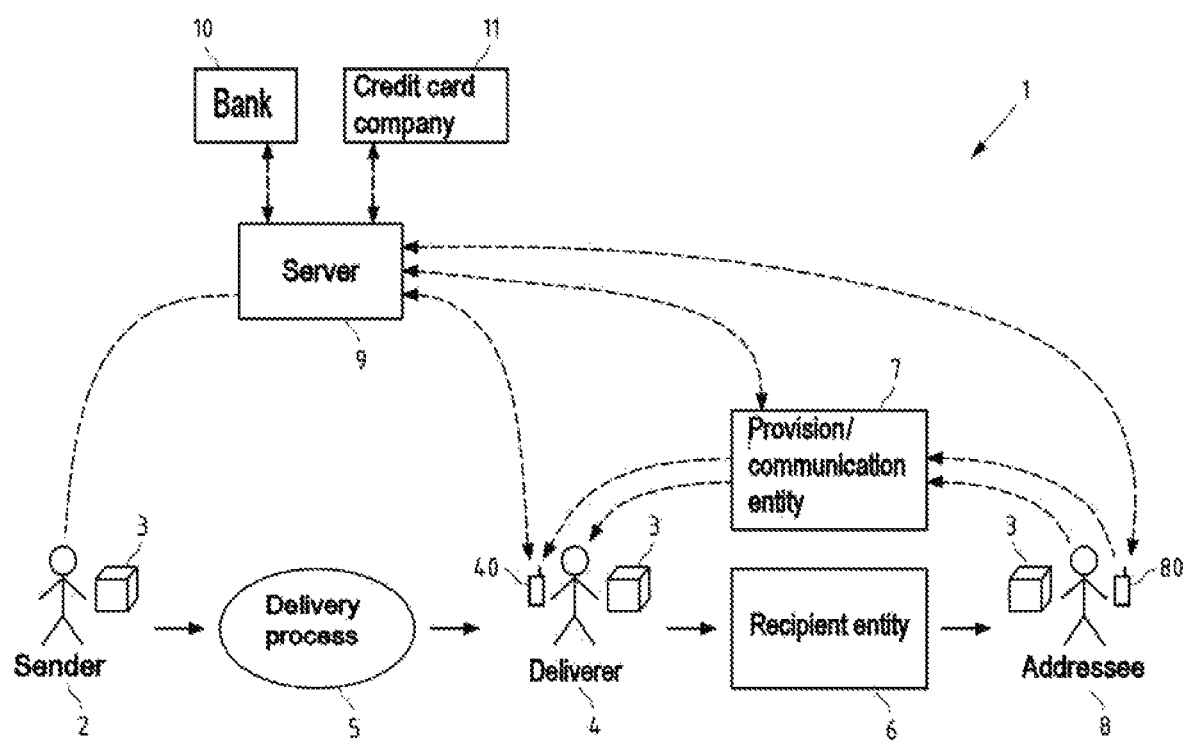
FIG. 1 shows a schematic illustration of one exemplary embodiment of a system according to the present invention.

FIG. 1 is a schematic illustration of one exemplary embodiment of a system 1 according to the present invention.

The system 1 shows using solid arrows the path of a shipment 3 along various stations of a delivery chain from a sender 2 to an addressee 8 of the shipment 3, and shows using dashed arrows the information flow between the components of the system 1. In this case, the information flow should be understood to be logical, in particular, that is to say may be performed via physical intermediate elements such as relays or routers, for example, particularly in the case of connections that are wireless at least in sections.

A shipment 3, which may be for example a letter (in particular a letter with a good contained therein, e.g. a book), a package or a parcel, is handed over by a sender 2, who for example also is, but need not necessarily be, the vendor of a good contained in the shipment 3, for dispatch by a delivery company. The way in which the shipment 3 is specifically mailed by the sender 2 is not illustrated in detail in FIG. 1. By way of example, the sender 2 mails the shipment 3 at a branch of the delivery company. However, for example in the case of large numbers of shipments 3 arising daily, as is the case for online retailers, the sender 2 may also deliver the shipment 3 directly to a sorting center of the delivery company. The delivery process 5 following the mailing of the shipment 3 by the sender 2 is merely illustrated schematically in FIG. 1. It ultimately leads to the delivery of the shipment 3 by a deliverer 4 into/to a recipient entity 6.

The recipient entity 6 is situated at the delivery location at the delivery time and receives the shipment 3 from the deliverer 4. The recipient entity 6 may be a person or an apparatus to/into which the shipment 3 is delivered. As illustrated by way of example in FIG. 1, the recipient entity 6 may be an entity that differs from the addressee 8 of the shipment 3, such that after the shipment 3 has been delivered by the deliverer 4, the shipment 3 also undergoes a transfer of the shipment 3 from the recipient entity 6 to the addressee 8. In this case, therefore, the recipient entity 6 enables the delivery of the shipment 3 even in the absence of the addressee 8. However, the recipient entity may also embody the addressee 8, such that, in a departure from the illustration in FIG. 1, then it is no longer necessary for the shipment 3 to be transferred from the recipient entity 6 to the addressee 8.

The addressee 8 of the shipment 3 is the person for whom the shipment 3 is intended. This is, for example, but not necessarily, the person who has ordered and/or paid for a good contained in the shipment 3. The addressee 8 of the shipment 3 is for example designated in a delivery address of the shipment 3 and/or identifiable in some other way as the person for whom the shipment is intended, for example in a database on the basis of an identifier of the shipment.

The recipient entity 6 may comprise the following, for example:
- the addressee 8;
- a person who receives the shipment 3 instead of the addressee 8, e.g. a family member of the family of the addressee 8, a fellow occupant or a neighbor of the addressee 8;
- a, more particularly lockable, storage compartment, in particular in a construction (e.g. in a building, a garage or a summerhouse) or in an apparatus, for example in a lockbox installation (e.g. a package station), in a mailbox and/or parcel box (which is installed for example at the place of residence or place of business of the addressee 8), in a vehicle (e.g. a luggage compartment), wherein at least the addressee may obtain access to the storage compartment in order to remove the shipment 3,
- a storage site accessible to the addressee 8, in particular part of a property of the addressee 8, such as a patio, for example,
- a store into which the addressee 8 may have one or more shipments 3 delivered and then supplied by a delivery service (which differs for example from the delivery company to which the deliverer is assigned), in particular in accordance with a delivery time or time window specified by the addressee 8, or
- a storage site in which services are offered and/or goods and/or meals and/or fuels are sold (e.g. a parcel shop, a retail outlet, a service branch, a filling station, a restaurant, etc.) and from which the addressee 8 may collect the shipment 3 in particular during the opening hours of the storage site.

In accordance with exemplary embodiments of the present invention, the shipment 3 is mailed by the sender 2 as a so-called cash on delivery shipment. A good contained in the shipment 3, for example a good ordered from an online retailer 2 by a person, for example the addressee 8, has thus not yet been paid for at the time of mailing the shipment 3 for dispatch. In exemplary embodiments of the invention, this payment for the good is performed by a person, who is for example the buyer of the good and/or the addressee 8 of the shipment 3, before the time of the delivery of the shipment 3 into/to the recipient entity 6, at this time or afterward, but preferably not by payment of cash to the deliverer 4. In exemplary embodiments of the invention, it is possible, in particular, that a cash on delivery shipment may be delivered without the addressee 8 of the shipment 3 being present at the delivery location at the delivery time.

The sender 2 informs the server 9, which is in particular a server of the delivery company which is responsible for the delivery of the shipment 3, when the shipment 3 is mailed, about the fact that the shipment 3 is a cash on delivery shipment, for example via a web page provided by the server 9 for this purpose or a different communication interface (for example via an application programming interface (API)). As early as from this point in time on, the shipment 3 may be assigned an identifier by means of which the shipment 3 is identifiable (in particular uniquely). In the server 9, with respect to the identifier, the fact that the associated shipment 3 is a cash on delivery shipment may then be stored in a database, for example.

In contrast to the cash on delivery method known from the prior art, in which the good contained in the shipment 3 is paid for in cash vis a vis the deliverer 4 at the time of delivery of the shipment 3, in exemplary embodiments of the present invention it is necessary for the deliverer 4 to be enabled in some other way to decide whether said deliverer is permitted to deliver the shipment 3. This decision may be linked for example to obtaining or capturing of first information by the deliverer 4 or a device 40 of the deliverer 4 (e.g. a handheld scanner or a cellular phone, in particular a smartphone). In exemplary embodiments of the invention, said first information is provided for capture or communicated (e.g. transmitted) to the deliverer 4 or the device 40 thereof by the provision or communication entity 7.

The provision or communication entity 7 may be for example a person, e.g. a person (e.g. a family member or a fellow occupant) living with the addressee 8 at the same address or a neighbor, or an apparatus. The provision or communication entity 7 may be situated at the delivery location for example at least at the delivery time. If the entity 7 is an apparatus, the latter may for example be installed fixedly (in particular on a long-term basis) at the delivery location or have been positioned there at least for the delivery time. If the entity 7 is an apparatus, the entity 7, insofar as the recipient entity 6 is embodied as an apparatus, may for example be part of the recipient entity 6 or be operatively connected thereto.

If the entity 7 is a person, this may be, if the recipient entity 6 is also a person, the same person, for example.

The provision or communication entity 7 is illustrated by way of example in FIG. 1 as an entity 7 that differs from the addressee 8 and the device 80 thereof (e.g. a cellular phone or computer), although this is not obligatory. By way of example, the provision or communication entity 7 may also be the addressee 8 or the device 80 thereof.

The provision or communication entity 7 may comprise for example the following:

the addressee 8;

the device 80 of the addressee 8; or a person who receives the shipment 3 instead of the addressee 8, e.g. a person (e.g. a family member or a fellow occupant) living with the addressee 8 at the same address or a neighbor of the addressee 8;

or may be embodied as follows:

if the recipient entity 6 is a, more particularly lockable, storage compartment in a construction (e.g. in a building, a garage or a summerhouse), the entity may be part of an access control system for at least part of the construction;

if the recipient entity 6 is a, more particularly lockable, storage compartment in an apparatus, for example in a lockbox installation (e.g. a package station), in a mailbox and/or parcel box (which is installed for example at the place of residence or place of business of the addressee 8) or in a vehicle (e.g. a luggage compartment), the entity 7 may be for example part of the apparatus, in particular of a control unit of the apparatus, or be operatively connected to the apparatus, in particular to the control unit thereof;

if the recipient entity 6 is a store into which the addressee 8 may have one or more shipments 3 delivered and then supplied by a delivery service (which differs for example from the delivery company to which the deliverer is assigned), the entity 7 may be for example an apparatus or person associated with the store (for example situated there), or if the recipient entity 6 is a storage site in which services are offered and/or goods and/or meals and/or fuels are sold (e.g. a parcel shop, a retail outlet, a service branch, a filling station, a restaurant, etc.) and from which the addressee 8 may collect the shipment 3 in particular during the opening hours of the storage site, the entity 7 may be for example an apparatus or person associated with the storage site (for example situated and/or employed there).

The first information may be the following:

delivery consent information from which it follows or is derivable that a person (in particular the addressee 8) consents to the delivery of a shipment 3 identifiable at least using the delivery consent information despite the absence of the person, wherein the shipment 3 contains a good which must be paid for in the case of delivery;

paid information from which it follows or is derivable that a payment for a good contained in a shipment 3 identifiable at least using the paid information has been performed; or payment information with which a payment for a good contained in a shipment 3 may and is permitted to be performed at a person's (in particular the addressee 8) expense, in particular without further involvement of the person.

The first information may be generated for example by the server 9, by the device 80 of the addressee 8 or by the provision or communication entity 7, for example at the instigation of the addressee 8, but alternatively also without instigation by the addressee 8. It may then be communicated to the provision or communication entity 7 indirectly or directly, in order then to be able to be obtained or captured for example by the deliverer 4 or the device 40 thereof.

Figure 2:
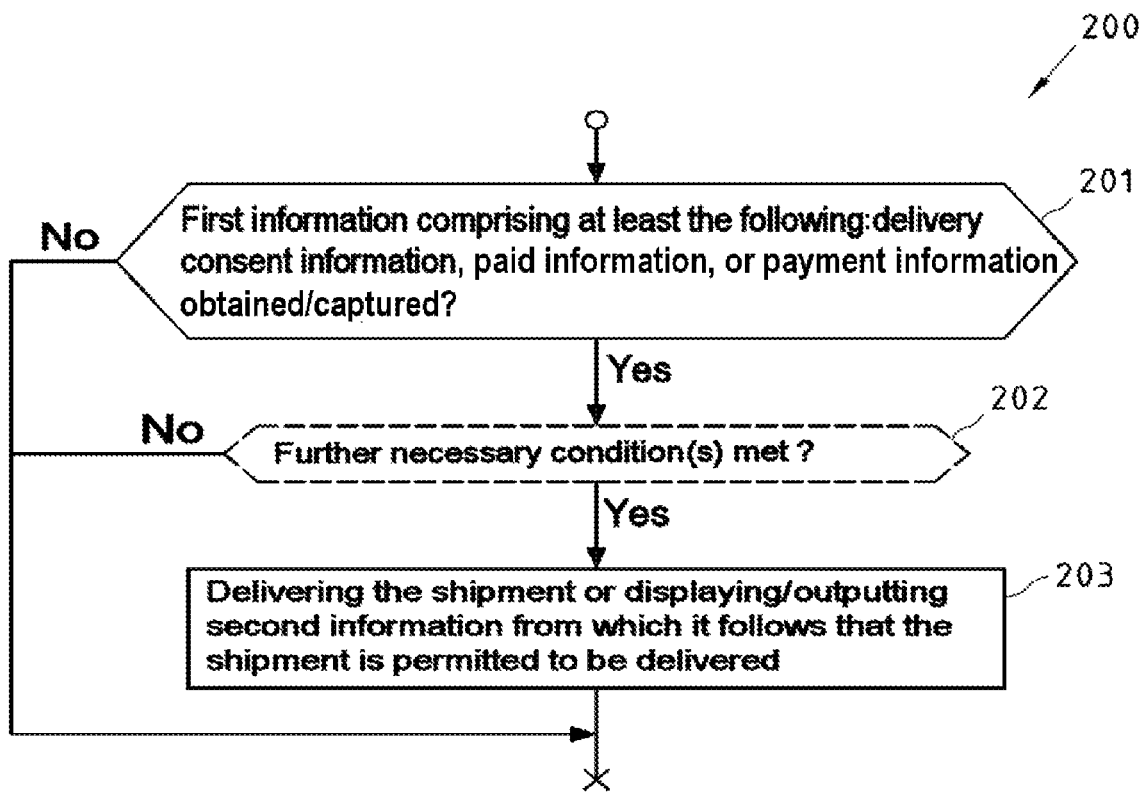
FIG. 2 shows a flow diagram of one exemplary embodiment of a method in accordance with the first aspect of the present invention.

FIG. 2 is a flow diagram of one exemplary embodiment 200 of a method in accordance with the first aspect of the present invention. This method 200 is performed for example by the deliverer 4 or the device 40 thereof. If the method is performed by the deliverer 4, step 203 comprises only delivering the shipment. If the method is performed by the device 40 of the deliverer 4, step 203 comprises only the step of displaying/outputting second information, from which it follows that the shipment is permitted to be delivered.

Step 201 involves checking whether first information comprising at least delivery consent information, paid information or payment information was obtained or captured, in particular from the provision or communication unit 7.

Obtaining or capturing may likewise be part of the method 200. Obtaining or capturing may be performed for example only if the deliverer 4 or the device 40 of the deliverer has successfully provided authentication, in particular vis a vis the provision or communication entity 7.

By way of example, obtaining the first information is performed via a communication connection between the device 40 of the deliverer 4 and the device 80 of the addressee 8. Setting up the communication connection may likewise be part of the method 200. For setting up the communication connection (for example for obtaining a communication address of the addressee 8 that is required for this purpose), it may be necessary for a successful authentication of the deliverer 4 or the device 40 thereof vis a vis an apparatus situated at the delivery location at least at the delivery time to have taken place.

If it is ascertained that no first information was obtained or captured, the method 200 skips steps 202 and 203 and ends. Otherwise, in an optional step 202 a check is made to ascertain whether one or more further necessary conditions are met. If this is the case, step 203 is performed; otherwise, step 203 is skipped and the method 200 ends.

In step 203, the shipment is delivered in particular to the recipient entity 6 or second information is displayed (e.g. as an indication on a user interface, e.g. a display unit) or output (e.g. as an acoustic signal) in particular on the device 40. It follows from the second information, in particular for the deliverer 4, that the shipment is permitted to be delivered.

An exemplary necessary condition which may be checked in step 202 is that at least part of the first information (in particular the entire first information) must be authentic and/or have integrity. This may be checked on the basis of check information contained for example in the first information, as will be explained in even greater detail below.

An additional or alternative exemplary condition which may be checked in step 202 is that the encountered possibility(-ies) concerning delivery must obey a form of delivery that is predetermined in particular by the addressee. Third information stating in which form the delivery may be performed, that is to say for example into/to which locations/compartments and/or to which persons delivery is permitted to be performed in the absence of the addressee (from the delivery location at the delivery time), may have been obtained or captured for example together with the first information.

If the first information comprises payment information, an additional or alternative exemplary condition which may be checked in step 202 is that a process of payment for the good using the payment information was able to be successfully concluded or that a check of the correctness of the payment information and/or of sufficient covering funds or a sufficient payment framework of an account specified in the payment information has proceeded successfully. The payment process may be performed by the server 9, for example, in particular on the basis of the payment information which the server 9 has obtained from the device 40 of the deliverer 4. The server 9 handles the payment for example with a server 10 of the bank or a server 11 of a credit card company, to mention just a few examples. A result of the payment process is then communicated to the device 40 by the server 9 and may be used in the checking in step 202. In a similar manner, it is also possible to check the correctness of the payment information and/or the covering funds or the payment framework of the account specified in the payment information.

Figure 3:
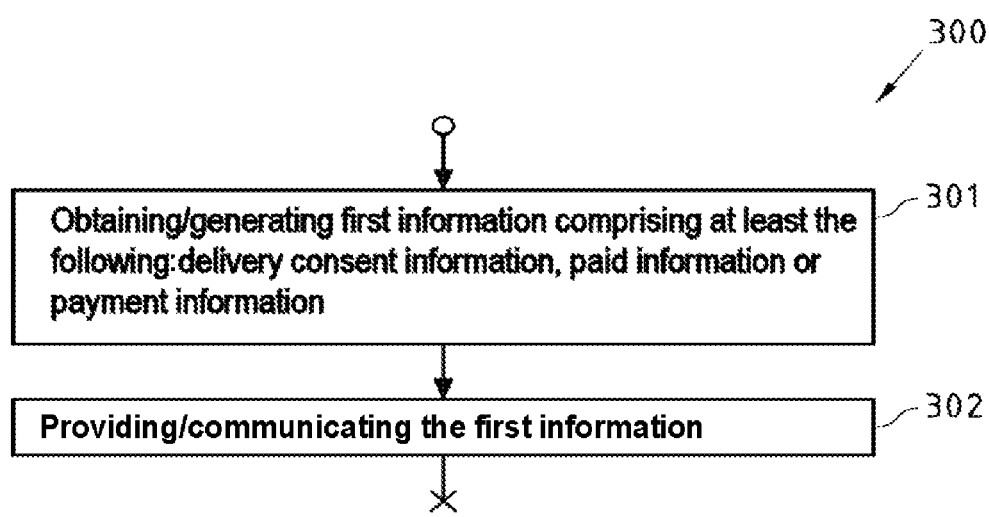
FIG. 3 shows a flow diagram of one exemplary embodiment of a method in accordance with the second aspect of the present invention.

FIG. 3 is a flow diagram of one exemplary embodiment 300 of a method in accordance with the second aspect of the present invention. This method 300 is performed for example by the server 9 (step 301 then comprises for example generating the first information, and step 302 then comprises for example communicating the first information). Alternatively, the method may be performed by the device 80 of the addressee 8. As a further alternative, the method may be performed by the provision or communication entity 7.

Step 301 involves generating or obtaining first information comprising at least delivery consent information, paid information or payment information. In particular generating the first information in step 301, or alternatively communicating the generated first information in step 302, in particular to the addressee 8 or to the device 80 thereof, may be performed for example only in the case of a previous check having a positive outcome.

If the first information comprises delivery consent information, it is possible for example to check whether the addressee is classified as trustworthy, that is to say for example with high probability will pay for the good contained in the shipment 3 even after delivery has been performed. This may be decided for example on the basis of a profile of the addressee 8, which for example is stored at the server 9 and maintained there, in particular. The profile is based for example on a payment history of one or more previous cash on delivery shipments directed to the addressee 8. The profile identifies the addressee 8 as trustworthy, for example, if said addressee paid completely for example for the last three cash on delivery shipments within a respective time of two weeks after delivery was performed.

If the first information comprises paid information, it is possible for example to check whether a complete payment for the good has been performed.

Alternatively, generating the first information in step 301 may also be initiated as a reaction to a successfully concluded process for payment for the good contained in the shipment 3.

The payment for the good contained in the shipment 3 may be performed for the addressee 8 for example by the server 9, for example on the basis of payment information which the addressee 8 has communicated to the server 9 for the current payment process (for example in an interrogation dialog) or which the addressee 8 has stored at the server 9. The payment may be performed automatically, in particular, if the addressee 8 for example has selected a cash on delivery shipment in a list of one or more cash on delivery shipments and has chosen the action "automatic payment". Said list may be displayed to the addressee 8 for example on a web page of the server 9 or in an application which is installed on the device 80 of the addressee 8 and communicates with the server 9. If the payment process is successfully concluded, for example paid information is generated and may then be provided or communicated in step 302.

The server 9 may be configured for example to perform the payment for the addressee (in particular automatically) by means of one (for example selected beforehand by the addressee 8) of the following payment methods: payment on the basis of credit card information, payment by direct debit, payment by transfer, payment via a payment system provider (e.g. PayPal), with which the person has an account, payment by prepaid credit card or prepaid code, or payment by cellular phone account.

The server 9 may perform for example the function of a payment service provider that is customary in the case of online shops, that is to say may enable the addressee 8 to pay for the good in accordance with one or more payment methods. By way of example, in this case the server 9 has recourse to stored payment information of the addressee, or interrogates said information anew from the addressee 8 upon every payment. By way of example, the payments are not credited to the account of the sender 3, but rather to one or more accounts of the delivery company and are then credited from these accounts to the respective sender 2 for example only in a downstream process. This may simplify and/or accelerate the payment process since shipment-specific/sender-specific account information need not be taken into consideration at the time of payment. The server 9 communicates with servers of banks 10, credit card companies 11 or payment service providers (not illustrated in FIG. 1) in the course of handling the payment Said servers may make available payment interfaces (so-called payment gateways), for example, by means of which payments may be performed.

If the payment is intended to be made by means of credit card information, for example, the delivery company (which operates the server 9) has registered itself with a credit card company, for example, and obtained a contract number. In order to make the payment, the server 9 passes on said contract number, the credit card information (e.g. credit card number and, if appropriate, security number or further information) of the addressee and indications concerning the magnitude of the amount to be paid to the server 11 of the credit card company, which server has access to the credit card account of the addressee 8 and performs the corresponding transaction (crediting the amount from the addressee's account to the account of the delivery company).

If the payment is intended to be made by direct debit, for example, the server 9 transmits the account information (in particular account number and bank sort code) of the addressee 8 and the account information of the delivery company to the server 10 of the bank of the delivery company. The bank of the delivery company then collects the direct debit from the addressee's bank and credits it to the account of the delivery company.

If the addressee 8 makes available or has stored respective pieces of payment information, the server 9 may also perform payments in accordance with other payment methods (for example payments via payment service providers, if the access data to the account of the addressee 8 were made known to the server 9 at a payment service provider).

Instead of performing the function of the payment service provider itself, the server 9 may, however, also cause this functionality to be fulfilled at least partly by a payment service provider, which then is supplied with the information required to make the payment by the server 9, for example, and performs the communication with the servers 10 or 11.

Alternatively, the addressee 8 may also be offered the option to keep an own account at the server 9, and, if the willingness of the addressee 8 to pay for a good is present, said account is correspondingly charged directly. The addressee 8 may then "load" this account by means of transfer, for example. The addressee 8 may also be granted a certain credit facility if the payment for a good is not covered by the current account balance. In this alternative, too, the payment for the good may be performed automatically.

As further payment methods, the server 9 may support the addressee 8 in payment methods such as payment by cash card (in which, usually, a cash card has to be inserted into a card reader connected to the person's device and a PIN has to be entered on said card reader) or payment by transfer (in which, generally, transaction-specific code, such as an mTAN or Photo-TAN, for instance, is supplied to the addressee 8 on a separate communication channel at the time of payment and has to be indicated by said addressee in order to complete the transaction), to mention just a few examples.

As part of the first information, it is also possible to generate check information that makes it possible to check the authenticity and/or integrity of at least part of the first information (the part comprises, for example, part of the first information to which the check information relates, and the check information itself). The check information may comprise for example a signature (e.g. in the form of an encrypted HASH value) or a Message Authentication Code (MAC), e.g. an HMAC or CMAC, by means of part of the first information (in particular by means of the delivery consent information, the paid information or the payment information). The check information (in particular in the form of a signature) may be based for example on a private cryptographic key that is known only to the apparatus that generates the check information, that is to say for example to the server 9. The authenticity and/or integrity of the first information may then be checked for example on the basis of a key corresponding to said private key, e.g. a public key that forms an asymmetrical key pair with the private key, for example on the device 40 of the deliverer 4. Alternatively, the apparatus that generates the check information (e.g. the server 9) and the apparatus(es) using the check information (in particular a message authentication code) for checking may both have the same key in each case.

The first information may contain for example the delivery consent information, the paid information or the payment information in text form (e.g. as ASCII characters).

The delivery consent information may have for example the following content:
"Addressee<Name, First name> consents to the delivery of the cash on delivery shipment <Shipment identifier> even in the absence of the addressee; payment will be made later".

Third information may be added, for example:
"Addressee<Name, First name> consents to the delivery of the cash on delivery shipment <Shipment identifier> in the addressee's parcel box even in the absence of the addressee; payment will be made later".

However, the delivery consent information may also comprise even more or fewer pieces of information, for example only an identifier of the shipment.

The paid information may have the following content, for example:
"Cash on delivery shipment<Shipment identifier> has already been paid for completely."

The paid information may additionally also express the consent of the addressee 8 for delivery of the shipment 3 even in the absence of the addressee, and if appropriate also comprise third information concerning the permissible form of the delivery:
"Cash on delivery shipment <Shipment identifier> has already been paid for completely and may be delivered in the parcel box of the addressee <Name, First name> even in the absence of the addressee."

The payment information may have the following content, for example:
"The amount <Amount> for the cash on delivery shipment <Shipment identifier> is permitted to be debited by direct debit from the account <Account number, bank sort code> of <Name, First name>."

Such first information may easily be captured by the deliverer 4, if it is displayed for example on a user interface of the device 40 of said deliverer.

Additionally or alternatively, the first information may be represented in a predefined format better suited to machine processing, for example in binary form with successive fields each having a defined length with the following pieces of information (fields having a variable length with field separating characters may alternatively be used), e.g.:
Information type|Shipment identifier|Delivery form| . . . .

The information type then indicates for example what type of first information is involved (e.g. on the basis of two bits: "00": delivery consent information, "01": paid information, "10": payment information, "11": reserved). The format of the first information may depend on the information type, for example, that is to say may include in each case only fields for those pieces of information which are required.

The field of the information type may be dispensable if only the use of one type of first information, that is to say for example only of the delivery consent information, only of the paid information or only of the payment information, is respectively supported in the system 1 in FIG. 1. An optimized format for the first information may then be used depending on the type of first information.

Correspondingly, a field for the check information may also be present in the formats described above.

Alternatively, the first information may also merely be generated as a first code to which a second code corresponds, said second code being associated for example with the shipment (for example being printed onto the shipment or being stored in a retrievable manner in a database (e.g. at the server 9) together with an identifier of the shipment with which it is associated). The second code matches the first code, for example. If for example the deliverer 4 or the device 40 thereof, e.g. during the delivery, then captures or obtains the first code from the provision or communication entity 7, and said first code corresponds to the second code, which for example is stored in the device 40 of the deliverer 4 together with the identifier of the shipment 3 and is findable with knowledge of the identifier of the shipment 3 (for example is printed on the shipment 3 or on a label of the shipment and is capturable by the device 40) in the device 40 of the deliverer, it may be assumed that the first code (and thus the first information) is authentic and has integrity. The second codes are loaded onto the device 40 of the deliverer 4 together with the associated shipment identifiers for example daily for the shipments to be delivered by the deliverer 4 on this day and are provided by the server 9, for example, for this purpose.

If a plurality of types of first information, that is to say for example delivery consent information and paid information, are supported in the system 1 in FIG. 1, a plurality of first codes may be generated for example in each case for a shipment, wherein each of the first codes represents a different type of first information and there is a respectively corresponding second code. It is also possible to generate, per type of first information (that is to say for example for delivery consent information), a plurality of first codes and accordingly, corresponding second codes, which, for example, besides the information content that consent is given to delivery of the shipment even in the absence of the addressee, or that a good contained in a shipment has been paid for, may then also code different further pieces of information, for example different third information (that is to say in what form the delivery is permitted to be performed). By way of example, the first codes (and the second codes corresponding thereto) are generated as random or pseudo-random codes and are respectively associated with different third information. A set of a plurality of second codes with information about the third information respectively represented by the second code is then made available to the device 40 for example for each shipment that has to be delivered by the deliverer on a day. If the deliverer 4 or the device 40 thereof, for example during the delivery of the shipment 3, then captures or obtains a first code from the provision or communication entity 7, on the basis of the identifier of the shipment 3 (which may be captured for example by the device 40 from the shipment 3 or a label of the shipment 3) in the device 40 it is possible to identify the data set with the second codes for said shipment 3 and to decide whether one of the second codes corresponds to the captured/obtained first code. If this is the case, the third information associated with said second code is determined and used in checking whether the shipment may be delivered under the states found.

The generation of the first information, as has already been discussed on the basis of the example of the paid information, may be initiated for example by the interaction of the addressee 8 with a web page which serves as an interface to the server 9 and is called up on a browser of the device 80, or by an application which is installed on the device 80 of the addressee 8 and which communicates with the server 9. By way of example, on the web page or in the application the addressee 8 has the opportunity to view information about the one or more shipments 3 currently to be delivered to said addressee (for example the delivery status thereof). The web page or the application may thus implement a shipment tracking service, for example. By way of example, the addressee 8 is enabled to initiate the generation of delivery consent information on the web page or in the application. In this case, further pieces of information, in particular the third information, with which the addressee 8 may define in what form the delivery is permitted to be performed in the absence of the addressee, may then be interrogated by the addressee 8 or selected by the latter. In this process, the addressee 8 may also be requested to declare explicitly (and in particular in a legally binding manner) the addressee's consent to the delivery of a relevant shipment despite the addressee's absence from the delivery location at the delivery time, for example by actuating a button (e.g. "Iconsent to the delivery of the shipment <Shipment identifier> even in the case of my absence.") or by issuing an electronic signature. If the delivery consent information is generated in this manner at the server 9 and, if appropriate, is provided with check information for the checkability of its authenticity and integrity, the deliverer 4, upon obtaining/capturing such delivery consent information, may be certain that the deliverer may deliver the shipment 3 despite the absence of the addressee 8. Additionally or alternatively, on the web page or in the application the addressee 8 may be enabled to pay for goods from shipments that are to be delivered to the addressee (for example under the control of the server 9 as described above), such that paid information may be generated after payment has been performed. Additionally or alternatively, the addressee 8 may also be given the opportunity to specify payment information from which first information may then likewise be generated.

By way of example, it is pointed out to the addressee 8 by means of a message that in the delivery process there is at least one cash on delivery shipment which is intended for said addressee and of which the good has not yet been paid for. The message may be directed for example to a communication address (e.g. an email address or cellular phone number) stored for the addressee in the server 9. The message may contain for example a link to a web page or an application (e.g. the web page or application described in the previous paragraph) on/with which the addressee 8 may generate (cause to be generated) first information, that is to say in particular delivery consent information, paid information or payment information, for the shipment (or a different shipment). Sending the message is initiated, in particular automatically, for example by an event in the delivery process. The event may be for example the captured passage of the shipment through a predetermined station, for example a scanning station, at which data of the shipment (for example an identifier of the shipment) are captured in particular optically.

In step 302 the first information is then provided or communicated. If the first information was generated by the server 9, communicating is performed for example by transmitting to the device 80 of the addressee. Communicating the first information is performed here for example in the context of the communication of the device 80 and of the server 9 during the interaction of the addressee 8 with the web page or in the context of the communication between the application installed on the device 80 and the server 9. Communicating the first information may be performed for example on the basis of the Internet protocol. The transmission may be based for example on a wired connection or at least partly on a wireless connection (particularly if the device 80 of the addressee is a mobile electronic device).

The first information obtained may then be displayed for example to the addressee 8 via a user interface of the device 80.

The addressee 8 may communicate the first information for example to the deliverer 4 or input it into the device 40 of the deliverer 4 or communicate it to the provision or communication entity 7 (particularly if this is a person, in particular a person who may also function as a recipient entity 6) or input it into the provision or communication entity 7 embodied as an apparatus (for example via a user interface). The communication to the deliverer 4 may be performed for example at the time of the delivery, in particular directly to the deliverer 4 or via a communication connection, in particular a mobile radio connection, between the device 40 of the deliverer 4 and the device 80 of the addressee 8. By way of example, the deliverer 4 using the device 40 thereof at the time of delivery, if the deliverer does not meet the addressee at the delivery location, sets up a communication connection to the addressee 8 in order to obtain from the latter the first information (in particular paid information or payment information). The deliverer 4 or the device thereof obtains the communication address of the addressee 8 for setting up the communication connection for example from an apparatus which was installed at the delivery location or positioned there at least for the time of the delivery, for example only after successful authentication of the deliverer vis a vis the apparatus. Alternatively, the apparatus does not issue the communication address of the addressee 8, but rather sets up directly (for example only after successful authentication of the deliverer 4 or the device 40 thereof) a communication connection to the device 80 of the addressee 8 and in this case functions as a terminal that can be used by the deliverer 4 to communicate with the addressee 8 and to obtain the first information. The apparatus may be part of a recipient entity 6 (e.g. a mailbox and/or parcel box) embodied as an apparatus or be operatively connected to such an apparatus (in particular the control unit thereof).

Alternatively, the first information communicated to the device 80 may be transmitted further to the provision or communication entity 7 (or to an apparatus operatively connected thereto), for example by wired transmission (e.g. via a Universal Serial Bus (USB) connection or a Local Area Network (LAN) connection) or at least partly wireless transmission (e.g. by means of a Wireless Local Area Network (WLAN)-connection, a Bluetooth connection, a Near Field Communication (NFC) connection or a cellular mobile radio connection, to mention just a few examples). It is also conceivable for the first information to be stored on a memory card of the device 80 and for said memory card then to be inserted into the provision or communication entity 7.

As already explained, the flow diagram of the method 300 in FIG. 3 also represents the actions of the addressee 8 or the device 80 thereof. In step 301, the first information is obtained, for example from the server 9 if the method 300 is performed by the device 80, or from the device 80 if the method 300 is performed by the addressee 8. Step 302 involves communicating/providing the first information, for example to the provision or communication entity 7 embodied as an apparatus or to the device 40 of the deliverer 4 if the method is performed by the device 80, or to the provision or communication entity 7 embodied as a person or to the deliverer 4 or to the device 40 thereof if the method 300 is performed by the addressee 8.

Finally, the flow diagram of the method 300 in FIG. 3 also represents the processing at the provision or communication entity 7. In step 301, the first information is obtained, for example from the device 80 of the addressee 8 or from the addressee 8. Step 302 involves providing or communicating the first information, particularly in order to enable capturing or obtaining by the deliverer 4 or the device 40 thereof.

If the provision or communication entity 7 is a person, providing or communicating the first information may be performed for example by the person communicating the first information to the deliverer 4 or inputting it into the device 40 of the deliverer 4.

If the provision or communication entity 7 is an apparatus, providing or communicating may be performed for example by at least temporarily displaying an optical representation of the first information or by outputting an acoustic representation of the first information. The optical representation may be for example a numeric, alphabetic or alphanumeric representation, such that the deliverer 4 may capture it. Alternatively, the optical representation may be for example a barcode (e.g. a one-dimensional or two-dimensional barcode, such as, for example, a QR code or datamatrix code). The optical representation may be capturable in particular by a capture unit of the device 40 of the deliverer 4. Said capture unit is also used, for example, to optically capture information printed on a shipment 3 or a label of the shipment 3. The optical representation of the first information may be displayed for example on an electronic display unit, for example on a display unit based on electronic ink and having a low energy consumption. The display unit is installed or positioned at the delivery location in particular in such a way that it is easily recognizable for the deliverer 4, for example on or at a mailbox installation and/or parcel box installation, at a house entrance, on or in an intercom system, on or in a user interface of a house automation system or access control system, etc. The optical display unit displays the first information for example only upon request by the deliverer 4 or the device 40 thereof, for example in reaction to the actuation of an operating element of the display unit or an apparatus connected thereto, or in reaction to the ascertainment of the fact that the device 40 of the deliverer 4 is situated in proximity to the optical display unit.

Providing or communicating the first information may also be performed by the entity 7 by the first information being transmitted wirelessly, for example at regular intervals and/or upon request by the device 40 and/or when an approach of the device 40 is captured. The first information may also be stored in a storage element of the provision or communication entity 7 and be readable wirelessly there. The wireless transmission/reading may be performed for example via a WLAN-connection, a Bluetooth connection, an NFC connection, a cellular mobile radio connection or other wireless connections.

The display or outputting or the transmission or enabling of reading is performed for example only if the deliverer 4 or the device 40 thereof has successfully provided authentication vis a vis the provision or communication entity 7 or an apparatus operatively connected thereto. Such an authentication of the deliverer 4 or the device 40 thereof may be necessary anyway for example in the delivering of the shipment to/into the recipient entity 6, for example in order to obtain access to a, more particularly lockable, storage compartment of the recipient entity 6 (e.g. of a mailbox and/or parcel box, of a vehicle, of a building or of a lockbox installation, in particular of a package station). Advantageously, the deliverer 4 or the device 40 thereof then only has to provide authentication once in order to obtain access to the storage compartment and to be able to obtain or capture the first information.

The first information is preferably erased in the provision or communication entity 7 after the delivery of the shipment 3 has been performed, and is then no longer provided/communicated. As a result, particularly when the first information is provided as an optical representation, this prevents the attention of third parties from being drawn to the fact that the delivery of the possibly valuable shipment 3 has been performed. This is advantageous, in particular, if the delivery was delivered into a storage compartment (e.g. of a mailbox installation and/or parcel box installation, of a vehicle or building or of a package station) or at a storage location accessible to the addressee 8, in particular part of a property of the addressee 8 such as a patio, for example. By way of example, after delivery has been performed, the entity 7 obtains information from the recipient entity 6 that the delivery of the shipment 3 has been performed and the first information (for example identifiable by a shipment identifier) related thereto may be erased and/or is intended no longer to be provided/communicated.

Figure 4:
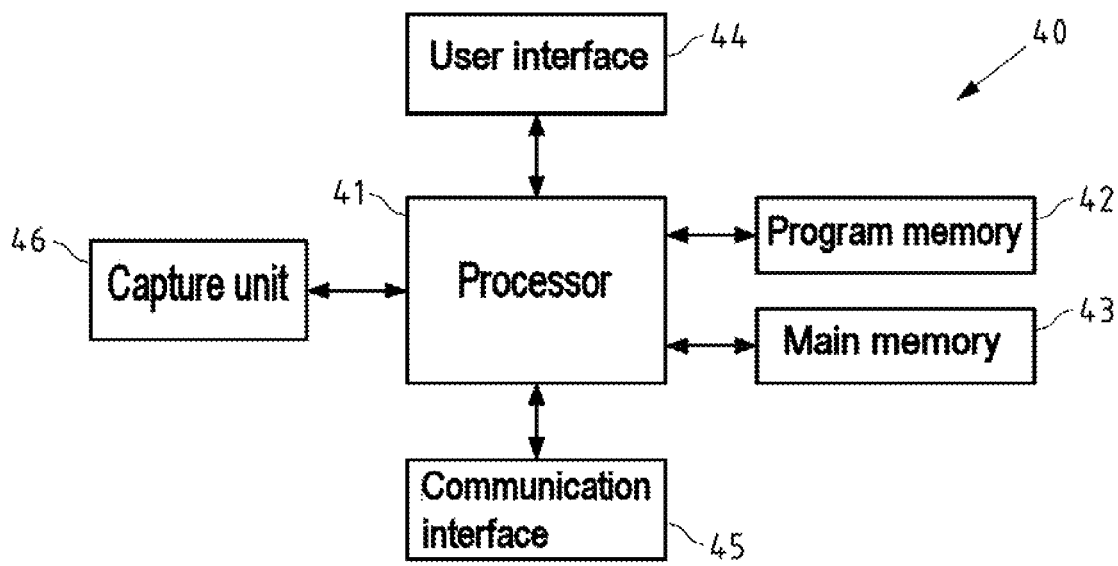
FIG. 4 shows a schematic illustration of one exemplary embodiment of an apparatus in accordance with the first aspect of the invention.

FIG. 4 shows a schematic illustration of one exemplary embodiment of an apparatus 40 in accordance with the first aspect of the invention. This involves, in particular, the device 40 of the deliverer 4, which may be embodied for example as a portable electronic device, in particular as a handheld scanner or cellular phone. The apparatus 40 may be configured for example to perform and/or control the method 200 in FIG. 2.

Apparatus 40 comprises a processor 41 with assigned main memory 43 and program memory 42. The processor 41 executes for example program instructions stored in the program memory 42. The program instructions perform the method in accordance with the first aspect of the invention and/or control it. Thus, the program memory 42 contains a computer program according to the first aspect of the invention and constitutes a computer program product for storing it.

The program memory 42 may be for example a persistent memory, such as a Read-Only-Memory (ROM), for example. The program memory 42 may for example be fixedly connected to the processor 41, but may alternatively be releasably connected to the processor 41, for example as a memory card, floppy disk or optical data carrier medium (e.g. a CD or DVD). Further information may also be stored in the program memory 42, or in a separate memory.

The main memory 43 is used for example for storing temporary results during the processing of the program instructions; this is for example a volatile memory, such as a Random-Access-Memory (RAM), for example.

The processor 41 is furthermore operatively connected to a communication interface 45, which enables information to be exchanged with other apparatuses for example (in this respect, see the dashed arrows in FIG. 1). The communication with the other apparatuses may be performed in a wired manner or wirelessly at least in sections. The communication interface 45 may support a plurality of different communication standards, for example WLAN, Bluetooth, NFC, USB, Ethernet, cellular mobile radio, etc.

The apparatus 40 furthermore comprises a capture unit 46, which may be embodied for example as an optical capture unit. The optical capture unit is able for example to capture information printed onto a shipment 3 or a label of a shipment 3, and/or to capture an optical representation of the first information. By way of example, the optical capture unit is configured to capture (and for example also to evaluate) barcodes.

The apparatus 40 furthermore comprises a user interface 44, which is controlled by the processor 41 and allows the interaction of the deliverer 4 with the apparatus 40. The user interface 44 may serve for example for displaying the second information. The user interface 44 may comprise for example an electronic display apparatus. The latter may be embodied for example as a touch-sensitive display apparatus, for example in order to enable the inputting of information, for example the first information by the addressee 8.

Figure 5:
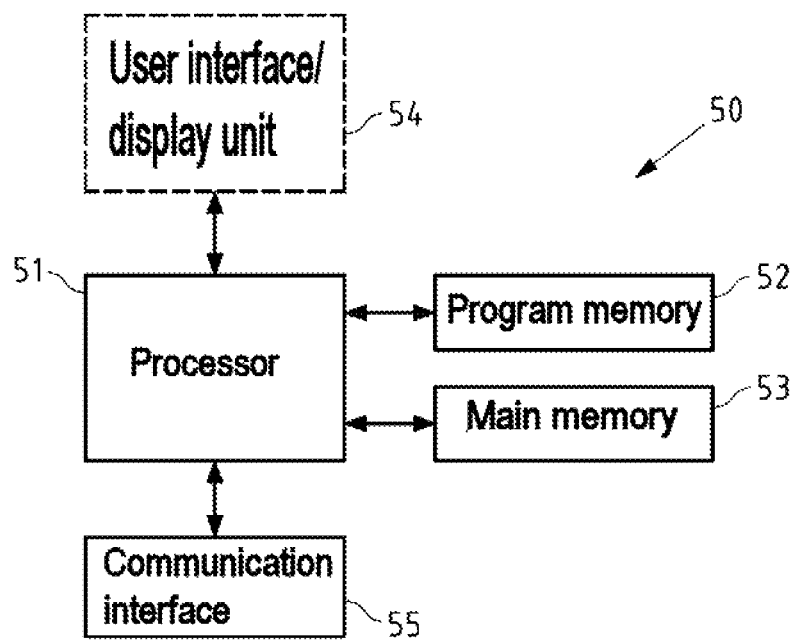
FIG. 5 shows a schematic illustration of one exemplary embodiment of an apparatus in accordance with the second aspect of the invention.

Finally, FIG. 5 shows a schematic illustration of one exemplary embodiment of an apparatus 50 in accordance with the second aspect of the invention. This may be, in particular, the server 9, the device 80 of the addressee or the provision or communication entity 7 (in so far as the latter is embodied as an apparatus). The apparatus 50 may be configured for example to perform and/or control the method 300 in FIG. 3. Apparatus 50 comprises a processor 51 with assigned main memory 53 and program memory 52.

The processor 51 executes for example program instructions stored in the program memory 52. The program instructions perform the method in accordance with the second aspect of the invention and/or control it Thus, the program memory 52 contains a computer program according to the second aspect of the invention and constitutes a computer program product for storing it.

With regard to the embodiment of the program memory 52, of the main memory 53 and of the communication interface 55, reference is made to the explanations in this regard concerning the corresponding components 42, 43 and 45 in FIG. 4.

Depending on which of the apparatuses 9, 7 or 80 is represented by the apparatus 50, further components may also be present. If the apparatus 50 represents the device 80 of the addressee 8, in particular a user interface 54, for example in the form of a touch-sensitive display, may be present. If the apparatus 50 represents the provision or communication entity 7, for example a display unit 54 may be present by means of which the first information is provided.

The following example embodiments of the invention are also disclosed:

Embodiment 1

Method, comprising:
obtaining or capturing first information by a deliverer or a device of the deliverer, wherein the first information comprises at least the following:
delivery consent information from which it follows or is derivable that a person consents to the delivery of a shipment identifiable at least using the delivery consent information despite the absence of the person, wherein the shipment contains a good which must be paid for in the case of delivery;
paid information from which it follows or is derivable that a payment for a good contained in a shipment identifiable at least using the paid information has been performed; or
payment information with which a payment for a good contained in a shipment may and is permitted to be performed at a person's expense, in particular without further involvement of the person; and
delivering the shipment or displaying or outputting second information from which it follows that the shipment is permitted to be delivered, wherein obtaining or capturing the first information is a necessary condition for performing the delivering of the shipment or the displaying or outputting of the second information.

Embodiment 2

Method, comprising:
obtaining or generating first information, wherein the first information comprises at least the following:
delivery consent information from which it follows or is derivable that a person consents to the delivery of a shipment identifiable at least using the delivery consent information despite the absence of the person, wherein the shipment contains a good which must be paid for in the case of delivery;
paid information from which it follows or is derivable that a payment for a good contained in a shipment identifiable at least using the paid information has been performed; or payment information with which a payment for a good contained in a shipment may and is permitted to be performed at a person's expense without further involvement of the person; and providing or communicating the first information, wherein a capturing or obtaining of the provided or communicated first information by a deliverer or a device of the deliverer is a necessary condition for the shipment to be delivered by the deliverer.

Embodiment 3

Method according to any of the preceding embodiments, wherein the first information is provided by or at a first apparatus and is captured by the device of the deliverer.

Embodiment 4

Method according to any of Embodiments 1-2, wherein the first information is communicated by a first apparatus and obtained by the device of the deliverer.

Embodiment 5

Method according to any of Embodiments 3-4, wherein the first apparatus is situated at that location at which the delivery of the shipment is performed.

Embodiment 6

Method according to any of Embodiments 3-5, wherein the first apparatus is part of a second apparatus or is operatively connected to the second apparatus, and wherein the second apparatus is a mailbox installation and/or parcel box installation having one or more compartments for receiving shipments even in the absence of the recipient, a building automation system or building control system, an access control system for buildings or vehicles, a door communication system or an electronic display sign.

Embodiment 7

Method according to any of Embodiments 3-6, wherein the first information is generated by a third apparatus, in particular a server or a device of a person for whom the shipment is intended, and is transmitted indirectly or directly to the first apparatus or to a second apparatus operatively connected to the first apparatus.

Embodiment 8

Method according to any of Embodiments 3-7, wherein the first information is generated by a server, is transmitted to a device of a person for whom the shipment is intended, and is transmitted by the device to the first apparatus or to a second apparatus operatively connected to the first apparatus.

Embodiment 9

Method according to any of Embodiments 1-2, wherein the first information is input into a device of the deliverer or communicated or shown to the deliverer by a person.

Embodiment 10

Method according to any of Embodiments 1-2, wherein the first information is communicated to the deliverer by a person in the context of a communication based on telephony, videotelephony or electronic messages with text and/or images.

Embodiment 11

Method according to Embodiment 10, wherein the communication is conducted by the person with a mobile communication device, in particular a cellular phone.

Embodiment 12

Method according to any of Embodiments 10-11, wherein a communication address for setting up the communication with the person is provided for or communicated to the deliverer or the device thereof at the delivery location.

Embodiment 13

Method according to any of Embodiments 10-11, wherein a communication address for setting up the communication with the person is stored in an apparatus which is situated at the delivery location of the shipment and sets up the communication between the deliverer and the person, in particular without the communication address becoming known to the deliverer or the device thereof.

Embodiment 14

Method according to any of the preceding embodiments, wherein the first information is generated using an identifier of the shipment, in particular a shipment tracking number for the shipment.

Embodiment 15

Method according to any of the preceding embodiments, wherein the first information comprises check information which makes it possible to check the authenticity and/or integrity of at least part of the first information.

Embodiment 16

Method according to Embodiment 15, insofar as referring back to Embodiment 1, furthermore comprising:
checking the authenticity and/or integrity of at least part of the first information at least on the basis of the check information, wherein a positive result of checking is a further necessary condition for performing the delivering of the shipment or the displaying or outputting of the second information.

Embodiment 17

Method according to Embodiment 15, insofar as referring back to Embodiment 2, wherein checking the authenticity and/or integrity of at least part of the first information on the basis of the check information with a positive result is a further necessary condition for the shipment to be delivered by the deliverer.

Embodiment 18

Method according to any of Embodiments 1-14, wherein the first information comprises at least the delivery consent information or the paid information in the form of a first code, and wherein a second code is associated with the shipment or is determinable or retrievable for the shipment.

Embodiment 19

Method according to Embodiment 18, wherein the first information comprises at least the delivery consent information in the form of the first code, and wherein it follows or is derivable from the first code that a person consents to the delivery of the shipment despite the absence of the person if the first code corresponds to the second code in accordance with a predefined specification, in particular matches said second code.

Embodiment 20

Method according to Embodiment 18, wherein the first information comprises at least the paid information in the form of the first code, and wherein it follows or is derivable from the first code that a payment for the good contained in the shipment has been performed if the first code corresponds to the second code in accordance with a predefined specification, in particular matches said second code.

Embodiment 21

Method according to any of Embodiments 18-20, wherein the second code is printed onto the shipment or a label on the shipment, is stored readably in a storage element connected to the shipment or contained therein, is stored in a device of the deliverer and is identifiable there on the basis of pieces of information of the shipment, in particular an identifier of the shipment, or is stored in a server or is generatable by the latter and is retrievable by means of a device of the deliverer from the server on the basis of pieces of information of the shipment, in particular an identifier of the shipment.

Embodiment 22

Method according to any of the preceding embodiments, insofar as referring back to Embodiment 1, furthermore comprising:
 obtaining or capturing third information by a deliverer or a device of the deliverer, wherein it follows or is derivable from the third information in what form the delivery of the shipment is permitted to be performed in the absence of the person.

Embodiment 23

Method according to any of the preceding embodiments, insofar as referring back to Embodiment 2, furthermore comprising:
 obtaining or generating third information, wherein it follows or is derivable from the third information in what form the delivery of the shipment is permitted to be performed in the absence of the person, and
 providing or communicating the third information.

Embodiment 24

Method according to any of the preceding embodiments, wherein a necessary condition for enabling the person to use the first information with the delivery consent information to signal said person's consent to the delivery of the shipment despite the absence of the person is that the person, in particular on the basis of a profile created for the person, is classified as a person who will actually pay for the good contained in the shipment after the delivery has been performed.

Embodiment 25

Method according to any of the preceding embodiments, wherein the payment information comprises information for making a credit card payment, information for making a payment by direct debit or information for charging a debit to an account held with a delivery company responsible for the delivery of the shipment.

Embodiment 26

Method according to any of the preceding embodiments, wherein the payment for the good is made to a second entity, which differs from a first entity, which is the vendor of the good and/or the sender of the shipment, and is active in particular as a billing collection service provider for the first entity.

Embodiment 27

Method according to Embodiment 26, wherein the second entity is part of a company which performs at least part of the shipment delivery process or is economically associated with such a company.

Embodiment 28

Apparatus configured to perform and/or control the method according to any of the preceding embodiments or comprising respective means for performing and/or controlling the steps of the method according to any of the preceding embodiments.

Embodiment 29

Apparatus comprising at least one processor and at least one memory including program code, the memory and the program code configured to, with the at least one processor, cause an apparatus to perform and/or control at least the method according to any of the preceding embodiments.

Embodiment 30

System, comprising one or more apparatuses configured to perform and/or control the method according to any of Embodiments 1-28 or means for performing and/or controlling the steps of the method according to any of Embodiments 1-28.

Embodiment 31

Computer program, comprising program instructions that cause a processor to perform and/or control the method according to any of Embodiments 1-28 when the computer program runs on the processor.

The exemplary embodiments of the present invention described by way of example in this specification are intended to be understood as disclosed both individually and in all combinations with one another. In particular, the description of a feature comprised by an embodiment—unless explicitly explained to the contrary—in the present case also ought not be understood to mean that the feature is indispensible or essential for the function of the exemplary embodiment. The sequence of the method steps in the individual flow diagrams as outlined in this specification is not mandatory; alternative sequences of the method steps are conceivable. The method steps may be implemented in various ways; an implementation in software (by program instructions), hardware or a combination of both is thus conceivable for implementing the method steps. Terms used in the patent claims such as "comprise", "have", "include", "contain" and the like do not exclude further elements or steps. The wording "at least partly" includes both the case "partly" and the case "completely". The wording "and/or" is intended to be understood to the effect that the disclosure is intended to include both the alternative and the combination, that is to say "A and/or B" means "(A) or (B) or (A and B)". In the context of this specification, units, persons or the like in the plural mean a plurality of units, persons or the like. The use of the indefinite article does not exclude the plural. An individual device may perform the functions of a plurality of units or devices mentioned in the patent claims. Reference signs indicated in the patent claims should not be regarded as limitations of the means and steps used.

The invention claimed is:

1. Method of coordinating a delivery of a shipment with a good not yet paid for, the method comprising:
    obtaining or capturing first information by a portable device of a deliverer using optical capture or close-range radio communication,
        wherein the first information is obtained or captured from a first apparatus, wherein the first apparatus is situated at a location at which the delivery of the shipment is performed,
        wherein the first information is generated by a third apparatus and is transmitted indirectly or directly to the first apparatus or to a second apparatus operatively connected to the first apparatus, or wherein the first information is generated by a server, is transmitted to a device of a person for whom the shipment is intended, and is transmitted by the device to the first apparatus or to a second apparatus operatively connected to the first apparatus, and
        wherein the first information comprises at least:
        delivery consent information from which it follows or is derivable that a person consents to the delivery of the shipment identifiable at least using the delivery consent information despite absence of the person, wherein the shipment contains the good which must be paid for if the shipment is delivered; or
        paid information from which it follows or is derivable that a payment for the good contained in the shipment identifiable at least using the paid information has been performed; or
        payment information with which a payment for the good contained in the shipment may and is permitted to be performed at a person's expense;
    outputting second information that informs and authorizes the deliverer to deliver the shipment, by the portable device of the deliverer,
    wherein the obtaining or capturing the first information is a necessary condition for outputting of the second information.

2. Method according to claim 1, wherein the first apparatus is part of a second apparatus or is operatively connected to the second apparatus, and wherein the second apparatus is a mailbox installation and/or parcel box installation having one or more compartments for receiving shipments even in the absence of the recipient, a building automation system or building control system, an access control system for buildings or vehicles, a door communication system or an electronic display sign.

3. Apparatus comprising at least one processor and at least one memory including program code, the memory and the program code configured to, with the at least one processor, cause an apparatus to perform and/or control at least:
    obtaining or capturing first information by a portable device of a deliverer using optical capture or close-range radio communication,
        wherein the first information is obtained or captured from a first apparatus, wherein the first apparatus is situated at a location at which a delivery of a shipment is performed,
        wherein the first information is generated by a third apparatus and is transmitted indirectly or directly to the first apparatus or to a second apparatus operatively connected to the first apparatus, or wherein the first information is generated by a server, is transmitted to a device of a person for whom the shipment is intended, and is transmitted by the device to the first apparatus or to a second apparatus operatively connected to the first apparatus, and
        wherein the first information comprises at least:
        delivery consent information from which it follows or is derivable that a person consents to the delivery of the shipment identifiable at least using the delivery consent information despite absence of the person, wherein the shipment contains a good which must be paid for if the shipment is delivered; or
        paid information from which it follows or is derivable that a payment for a good contained in the shipment identifiable at least using the paid information has been performed; or
        payment information with which a payment for a good contained in the shipment may and is permitted to be performed at a person's expense;
    outputting second information that informs and authorizes the deliverer to deliver the shipment, by the portable device of the deliverer,
    wherein the obtaining or capturing the first information is a necessary condition for outputting of the second information.

4. Apparatus according to claim 3, the memory and the program code further configured to, with the at least one processor, cause the apparatus to perform and/or control at least:
    obtaining or capturing third information by the device of the deliverer, wherein it follows or is derivable from the third information in what form the delivery of the shipment is permitted to be performed in the absence of the person.

5. Apparatus according to claim 3, wherein the first apparatus is configured to display the first information and wherein the first information is optically captured by the portable device of the deliverer.

6. Apparatus according to claim 3, wherein the first information is at least one of delivery consent information or payment information and wherein, after the obtaining or capturing first information, the memory and the program code further configured to, with the at least one processor, cause the apparatus to perform and/or control:
    causing payment for the good before, at, or after a time of delivery.

7. Apparatus according to claim 3, wherein the first information comprises check information which makes it possible to check the authenticity and/or integrity of at least part of the first information, the memory and the program code further configured to, with the at least one processor, cause the apparatus to perform and/or control:

checking the authenticity and/or integrity of at least part of the first information at least on the basis of the check information, wherein a positive result of checking is a further necessary condition for performing the delivering of the shipment or the displaying or outputting of the second information.

8. Apparatus according to claim 3, wherein outputting second information that informs and authorizes the deliverer to deliver the shipment comprises outputting second information that informs and authorizes the deliverer to deliver the shipment under the condition that one or more further necessary conditions are met.

9. Apparatus according to claim 3, wherein the portable device of the deliverer comprises a display unit and wherein outputting the second information comprises displaying an indication whether the shipment is permitted to be delivered on a user interface of the display unit.

10. Computer-readable non-transitory storage medium storing a computer program comprising program instructions that cause a processor, when the computer program runs on the processor, to perform and/or control:

obtaining or capturing first information by a portable device of a deliverer using optical capture or close-range radio communication,
wherein the first information is obtained or captured from a first apparatus, wherein the first apparatus is situated at a location at which a delivery of a shipment is performed,
wherein the first information is generated by a third apparatus and is transmitted indirectly or directly to the first apparatus or to a second apparatus operatively connected to the first apparatus, or wherein the first information is generated by a server, is transmitted to a device of a person for whom the shipment is intended, and is transmitted by the device to the first apparatus or to a second apparatus operatively connected to the first apparatus, and
wherein the first information comprises at least:
delivery consent information from which it follows or is derivable that a person consents to the delivery of the shipment identifiable at least using the delivery consent information despite absence of the person, wherein the shipment contains a good which must be paid for if the shipment is delivered; or
paid information from which it follows or is derivable that a payment for a good contained in the shipment identifiable at least using the paid information has been performed; or
payment information with which a payment for a good contained in the shipment may and is permitted to be performed at a person's expense;
outputting second information that informs and authorizes the deliverer to deliver the shipment, by the portable device of the deliverer,
wherein the obtaining or capturing the first information is a necessary condition for performing the outputting of the second information.

11. Method of coordinating a delivery of a shipment with a good not yet paid for, the method comprising:

obtaining first information by a first apparatus or by a second apparatus operatively connected to the first apparatus, wherein the first apparatus is situated at a location at which a delivery of a shipment is performed,
wherein the first information is generated by a third apparatus and is transmitted indirectly or directly to the first apparatus or to the second apparatus or wherein the first information is generated by a server, is transmitted to a device of a person for whom the shipment is intended, and is transmitted by the device to the first apparatus or to the second apparatus, and
wherein the first information comprises at least:
delivery consent information from which it follows or is derivable that a person consents to the delivery of the shipment identifiable at least using the delivery consent information despite absence of the person, wherein the shipment contains the good which must be paid for if the shipment is delivered; or
paid information from which it follows or is derivable that a payment for the good contained in the shipment identifiable at least using the paid information has been performed; or
payment information with which a payment for the good contained in the shipment may and is permitted to be performed at a person's expense without further involvement of the person; and
providing or communicating the first information optically or using close-range radio communication by the first apparatus to a portable device of a deliverer in order to cause the portable device of the deliverer to output second information that informs and authorizes the deliverer to deliver the shipment,
wherein a capturing or obtaining of the provided or communicated first information by the portable device of the deliverer is a necessary condition for the shipment to be delivered by the deliverer.

12. Method according to claim 11, wherein the first apparatus is part of the second apparatus or is operatively connected to the second apparatus, and wherein the second apparatus is a mailbox installation and/or parcel box installation having one or more compartments for receiving shipments even in the absence of the recipient, a building automation system or building control system, an access control system for buildings or vehicles, a door communication system or an electronic display sign.

13. Method according to claim 11, wherein the first information is generated using an identifier of the shipment.

14. Method according to claim 11, wherein the first information comprises at least the delivery consent information or the paid information in a form of a first code, and wherein a second code is associated with the shipment or is determinable or retrievable for the shipment.

15. Method according to claim 14, wherein the first information comprises at least the delivery consent information in the form of the first code and it follows or is derivable from the first code that a person consents to the delivery of the shipment despite the absence of the person if the first code corresponds to the second code in accordance with a predefined specification, or wherein the first information comprises at least the paid information in the form of the first code and it follows or is derivable from the first code that a payment for the good contained in the shipment has been performed if the first code corresponds to the second code in accordance with a predefined specification.

16. Method according to claim 14, wherein the second code is printed onto the shipment or a label on the shipment, is stored readably in a storage element connected to the shipment or contained therein, is stored in the device of the deliverer and is identifiable there based on pieces of information of the shipment, or is stored in a server or is generatable by the latter and is retrievable by means of the device of the deliverer from the server based on pieces of information of the shipment.

17. Method according to claim 11, wherein the first information comprises at least the delivery consent information and wherein a necessary condition for enabling the person to use the first information to signal said person's consent to the delivery of the shipment despite the absence of the person is that the person, is classified as a person who will actually pay for the good contained in the shipment after the delivery has been performed.

18. Method according to claim 11, wherein the payment information comprises information for making a credit card payment, information for making a payment by direct debit or information for charging a debit to an account held with a delivery company responsible for the delivery of the shipment.

19. Method according to claim 11, wherein the payment for the good is made to a second entity, which differs from a first entity, which is a vendor of the good and/or a sender of the shipment, and is active for the first entity.

20. Apparatus comprising at least one processor and at least one memory including program code, the memory and the program code configured to, with the at least one processor, cause an apparatus to perform and/or control at least:
  obtaining first information by a first apparatus or by a second apparatus operatively connected to the first apparatus, wherein the first apparatus is situated at a location at which a delivery of a shipment is performed, wherein the first information is generated by a third apparatus and is transmitted indirectly or directly to the first apparatus or to the second apparatus or wherein the first information is generated by a server, is transmitted to a device of a person for whom the shipment is intended, and is transmitted by the device to the first apparatus or to the second apparatus, and
  wherein the first information comprises at least:
    delivery consent information from which it follows or is derivable that a person consents to the delivery of the shipment identifiable at least using the delivery consent information despite absence of the person, wherein the shipment contains the good which must be paid for if the shipment is delivered; or
    paid information from which it follows or is derivable that a payment for the good contained in the shipment identifiable at least using the paid information has been performed; or
    payment information with which a payment for the good contained in the shipment may and is permitted to be performed at a person's expense without further involvement of the person; and
  providing or communicating the first information optically or using close-range radio communication by the first apparatus to a portable device of a deliverer in order to cause the portable device of the deliverer to output second information that informs and authorizes the deliverer to deliver the shipment,
  wherein a capturing or obtaining of the provided or communicated first information by the portable device of the deliverer is a necessary condition for the shipment to be delivered by the deliverer.

21. Apparatus according to claim 20, wherein the first apparatus is part of the second apparatus or is operatively connected to the second apparatus, and wherein the second apparatus is a mailbox installation and/or parcel box installation having one or more compartments for receiving shipments even in the absence of the recipient, a building automation system or building control system, an access control system for buildings or vehicles, a door communication system or an electronic display sign.

22. Apparatus according to claim 20, wherein the first apparatus is configured to display the first information so that the first information is optically capturable by the portable device of the deliverer.

23. Apparatus according to claim 20, wherein
  transmitting the first information generated by the third apparatus indirectly or directly to the first apparatus or to the second apparatus is based on a) a wired connection if the third apparatus is a server and b) close-range communication, optical transmission or a wired connection if the third apparatus is a device of a person for whom the shipment is intended, and
  transmitting the first information generated by the server to the device of the person for whom the shipment is intended is based on a wired connection and transmitting the first information by the device of the person for whom the shipment is intended to the first apparatus or to the second apparatus is based on close-range communication, optical transmission or a wired connection.

24. Computer-readable non-transitory storage medium storing a computer program comprising program instructions that cause a processor, when the computer program runs on the processor, to perform and/or control:
  obtaining first information by a first apparatus or by a second apparatus operatively connected to the first apparatus, wherein the first apparatus is situated at a location at which a delivery of a shipment is performed, wherein the first information is generated by a third apparatus and is transmitted indirectly or directly to the first apparatus or to the second apparatus or wherein the first information is generated by a server, is transmitted to a device of a person for whom the shipment is intended, and is transmitted by the device to the first apparatus or to the second apparatus, and
  wherein the first information comprises at least:
    delivery consent information from which it follows or is derivable that a person consents to the delivery of the shipment identifiable at least using the delivery consent information despite absence of the person, wherein the shipment contains the good which must be paid for if the shipment is delivered; or
    paid information from which it follows or is derivable that a payment for the good contained in the shipment identifiable at least using the paid information has been performed; or
    payment information with which a payment for the good contained in the shipment may and is permitted to be performed at a person's expense without further involvement of the person; and
  providing or communicating the first information optically or using close-range radio communication by the first apparatus to a portable device of a deliverer in order to cause the portable device of the deliverer to output second information that informs and authorizes the deliverer to deliver the shipment,
  wherein a capturing or obtaining of the provided or communicated first information by the portable device of the deliverer is a necessary condition for the shipment to be delivered by the deliverer.

* * * * *